United States Patent
Ishibashi

(10) Patent No.: US 9,244,637 B2
(45) Date of Patent: Jan. 26, 2016

(54) SERVER APPARATUS, COMMUNICATION APPARATUS, AND COMPUTER-READABLE MEDIUM STORING PROGRAMS THEREFOR

(71) Applicant: BROTHER KOGYO KABUSHIKI KAISHA, Nagoya, Aichi (JP)

(72) Inventor: Masayuki Ishibashi, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/519,339

(22) Filed: Oct. 21, 2014

(65) Prior Publication Data

US 2015/0109639 A1    Apr. 23, 2015

(30) Foreign Application Priority Data

Oct. 22, 2013 (JP) ................. 2013-219650
Oct. 22, 2013 (JP) ................. 2013-219651

(51) Int. Cl.
*G06F 15/00* (2006.01)
*G06F 3/12* (2006.01)
*G06K 15/00* (2006.01)
*G06K 15/02* (2006.01)
*H04L 29/08* (2006.01)

(52) U.S. Cl.
CPC ............ *G06F 3/1208* (2013.01); *G06F 3/1203* (2013.01); *G06F 3/1224* (2013.01); *G06F 3/1236* (2013.01); *G06F 3/1238* (2013.01); *G06F 3/1256* (2013.01); *G06F 3/1287* (2013.01); *G06K 15/005* (2013.01); *G06K 15/022* (2013.01); *H04L 67/06* (2013.01); *H04L 67/02* (2013.01)

(58) Field of Classification Search
CPC ... G06F 3/1208; G06F 3/1203; G06F 15/005; G06F 15/022
USPC ........................................................ 358/1.15
See application file for complete search history.

(56) References Cited

U.S. PATENT DOCUMENTS 6,385,596 B1 *  5/2002  Wiser ..................... G06F 21/10
                                                    369/84

FOREIGN PATENT DOCUMENTS

JP          2008-283647 A     11/2008

* cited by examiner

*Primary Examiner* — Saeid Ebrahimi Dehkordy
(74) *Attorney, Agent, or Firm* — Scully, Scott, Murphy & Presser, P.C.

(57) ABSTRACT

A sever apparatus is configured to transmit designated image information including designated preview image data having a generally used format and is used to previewing designated image based on the designated proprietary data and designated accompanying information having a generally used format and is accompanying information of the designated image to the communication apparatus that output the designated proprietary data through the network interface. When the network interface obtains the modification information output by the communication apparatus after the designated image information is transmitted, and represents modifications to the designated image, the server apparatus retrieves the designated proprietary data from the storage device, and obtains modified designated image information reflecting the modification information based on the retrieved designated proprietary data and obtained modification information with use of the deciphering program, and transmits the modified designated image information to the communication apparatus that output the modification information through the network interface.

26 Claims, 9 Drawing Sheets

SERVER APPARATUS, COMMUNICATION APPARATUS, AND COMPUTER-READABLE MEDIUM STORING PROGRAMS THEREFOR

CROSS-REFERENCE TO RELATED APPLICATION

This application claims priority under 35 U.S.C. §119 from Japanese Patent Applications No. 2013-219650 and No. 2013-219651, both filed on Oct. 22, 2013. The entire subject matters of the applications are incorporated herein by reference.

BACKGROUND

1. Technical Field

The present disclosure relate to a server apparatus, a communication apparatus, a computer-readable medium storing programs for each of the server apparatus and communication apparatus.

2. Related Art

There are apparatuses in which an editing program designed to edit print data can be executed, and there are many kinds of platforms on which such an editing program runs.

SUMMARY

In order to use an editing program in each platform, it has been necessary to adapt the editing program for respective kinds of platforms. Such an adaptation is very troublesome and cost-consuming.

According to aspects of the disclosures, there is provided a non-transitory computer-readable recording medium for a server apparatus which has a processor, a network interface, a storage device storing a plurality of pieces of proprietary data having a proprietary format and used to form an image on a formation medium, the server apparatus being configured to be installed with a deciphering program which is capable of deciphering the proprietary data, the server apparatus being configured to execute an HTTP communication with a communication apparatus, the recording medium storing a control program having instructions to be executed by the processor. When the network interface obtains designated proprietary data identification information that is output by the communication apparatus and designates at least one of the plurality of pieces of the proprietary data stored in the storage device, the instructions cause, when executed by the processor, the sever apparatus to transmit designated image information including designated preview image data, which has a generally used format which the communication apparatus is capable of read and display, and is used to previewing designated image which is formed based on the designated proprietary data designated by the designated proprietary data identification information and designated accompanying information, which has a generally used format which the communication apparatus is capable of read and recognize as information, and is accompanying information of the designated image to the communication apparatus that output the designated proprietary data through the network interface, when the network interface obtains the modification information, which is output by the communication apparatus after the designated image information is transmitted, and represents modifications to the designated image, retrieve the designated proprietary data from the storage device, and obtain modified designated image information reflecting the modification information based on the retrieved designated proprietary data and obtained modification information with use of the deciphering program, and transmit the modified designated image information to the communication apparatus that output the modification information through the network interface.

According to further aspects of the disclosures, there is provided a non-transitory computer-readable recording medium for a communication apparatus which has a processor, a network interface and a display unit, the communication apparatus being configured to execute an HTTP communication with a server apparatus, the recording medium storing a control program having instructions to be executed by the processor, the server apparatus storing a plurality of pieces of proprietary data having proprietary format and is used to form an image on a medium, the server apparatus being configured to be installed with a deciphering program capable of deciphering the proprietary data, the recording medium storing a control program having instructions to be executed by the processor. With this configuration, the instructions, when executed by the processor, cause the communication apparatus to transmit designated proprietary identification information designating at least one of the plurality of pieces of proprietary data stored in the server apparatus to the server apparatus through the network interface, obtain designated image information including designated preview image data, which has a generally used image format which the communication apparatus is capable of reading and displaying and is used to preview the designated image that is formed based on designated proprietary data designated by the obtained designated proprietary data identification information and designated accompanying information, which has a generally used image format the communication apparatus is capable of reading and recognizing as information and is accompanying information of the designated image, from the server apparatus through the network interface, display a designated image preview image on the display device based on the obtained designated image information, monitor whether modification is applied to the designated image preview image displayed on the display unit and transmit modification information representing the modification to the designated image when the modification is detected to the server apparatus through the network interface, obtain modification designated information, which has a generally used image format the communication apparatus is capable of reading and is used to display designated image reflecting the modification information, from the server apparatus through the network interface, and display modified designated image preview image which is a preview image of the modified designated image based on the modified designated image information According to further aspects of the disclosures, there is provided a server apparatus, which includes a processor, a network interface, and a storage device storing a plurality of pieces of proprietary data having a proprietary format and used to form an image on a formation medium. The server apparatus is configured to be installed with a deciphering program which is capable of deciphering the proprietary data, the server apparatus being configured to execute an HTTP communication with a communication apparatus, and the recording medium stores a control program having instructions to be executed by the processor. When the network interface obtains designated proprietary data identification information that is output by the communication apparatus and designates at least one of the plurality of pieces of the proprietary data stored in the storage device, the instructions cause, when executed by the processor, the sever apparatus to transmit designated image information including designated preview image data, which has a generally used format which the communication apparatus is capable of read and display, and is used to previewing designated image which is formed based on the designated proprietary data designated by the designated proprietary data identification information and designated accompanying information, which has a generally used format which the communication apparatus is capable of read and recognize as information, and is accompanying information of the designated image to the communication apparatus that output the designated proprietary data through the network interface, and when the network interface obtains the modification information, which is output by the communication apparatus after the designated image information is transmitted, and represents modifications to the designated image, retrieve the designated proprietary data from the storage device, and obtain modified designated image information reflecting the modification information based on the retrieved designated proprietary data and obtained modification information with use of the deciphering program, and transmit the modified designated image information to the communication apparatus that output the modification information through the network interface.

According to furthermore aspects of the disclosures, there is provided a communication apparatus having a processor, a network interface, and a display unit. The communication apparatus is configured to execute an HTTP communication with a server apparatus, the recording medium storing a control program having instructions to be executed by the processor, the server apparatus storing a plurality of pieces of proprietary data having proprietary format and is used to form an image on a medium, the server apparatus being configured to be installed with a deciphering program capable of deciphering the proprietary data, the recording medium storing a control program having instructions to be executed by the processor. The instructions, when executed by the processor, cause the communication apparatus to transmit designated proprietary identification information designating at least one of the plurality of pieces of proprietary data stored in the server apparatus to the server apparatus through the network interface, obtain designated image information including designated preview image data, which has a generally used image format which the communication apparatus is capable of reading and displaying and is used to preview the designated image that is formed based on designated proprietary data designated by the obtained designated proprietary data identification information and designated accompanying information, which has a generally used image format the communication apparatus is capable of reading and recognizing as information and is accompanying information of the designated image, from the server apparatus through the network interface, display a designated image preview image on the display device based on the obtained designated image information, monitor whether modification is applied to the designated image preview image displayed on the display unit and transmit modification information representing the modification to the designated image when the modification is detected to the server apparatus through the network interface, obtain modification designated information, which has a generally used image format the communication apparatus is capable of reading and is used to display designated image reflecting the modification information, from the server apparatus through the network interface, and display modified designated image preview image which is a preview image of the modified designated image based on the modified designated image information

BRIEF DESCRIPTION OF THE ACCOMPANYING DRAWINGS

DETAILED DESCRIPTION OF THE ILLUSTRATIVE EMBODIMENT

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

System Configuration

Figure 1:
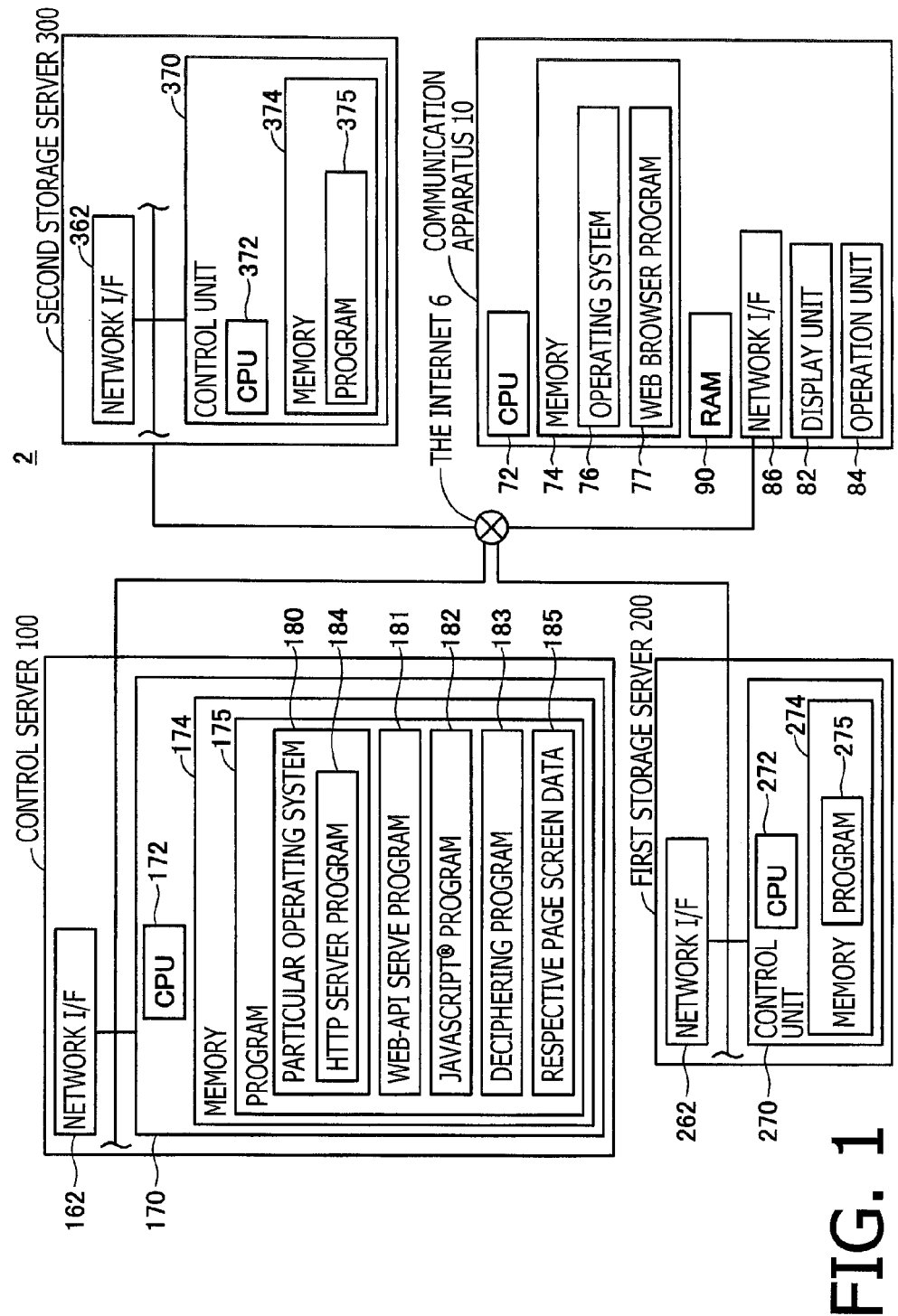
FIG. 1 is a block diagram showing a configuration of a communication system according to an illustrative embodiment.

A communication system 2 according to an illustrative embodiment includes, as shown in FIG. 1, a communication apparatus 10, a control server 100, a first storage server 200, and a second storage server 300. These apparatuses/devices are provided as distinctive apparatuses/devices according to the illustrative embodiment, and interconnected through the Internet 6.

The communication apparatus 10, the control server 100, the first storage server 200 and the second storage server 300 may be configured to communication in accordance with an HTTP (hypertext transfer protocol). It is noted that, according to the illustrative embodiment, the HTTP may include an HTTPS (hypertext transfer protocol secure). According to the illustrative embodiment, the communication apparatus 10 serves as an HTTP client. The control server 100 serves as an HTTP server when communicating with the communication apparatus 10, while the control server 100 serves as an HTTP client when communicating with the first storage server 200 and the second storage server 300. With the above configuration, the control server 100 can communicate with the communication apparatus 10, the first storage server 200 and the second storage server 300 without being blocked by a firewall.

Configuration of Communication Apparatus

The communication apparatus 10 is configured by, for example, a PC (personal computer). According to the illustrative embodiment, the communication apparatus 10 has a CPU (central processing unit) 72, a memory 74, a display unit 82, an operation unit 84, a network interface 86 and a RAM (random access memory) 90. The display unit 82 is used to display various pieces of information. The operation unit 84 is provided with a keyboard and mouse. A user of the communication apparatus 10 inputs various instructions and various pieces of information in the communication apparatus 10 through the operation unit 84. The network interface 86 is a device configured to transmit/receive various pieces of information through the Internet 6.

The memory 74 stores an OS (operating system) 76 and a Web browser program 77. The OS 76 is, as well-known, a program which controls basic operations of the communication apparatus 10. The CPU 72 executes various operations in accordance with the OS 76. It is noted that the OS 76 may be different from a particular operating system 180 which will be described later.

The Web browser program 77 is a program which configures a Web browser on the communication apparatus 10. By executing the Web browser program 77, the communication apparatus 10 is capable of executing an HTTP communication with a Web-API (Application Programming Interface) server configured on the control server 100. When the Web browser retrieves a proprietary data editing program used to edit proprietary data and executes the same, it becomes possible to edit the proprietary data on the Web browser. The proprietary data editing program is, for example, a program using JavaScript® (registered trademark of Oracle Corporation). The proprietary data is data using proprietary format, which has its intrinsic file format. The proprietary data is, for example, data representing an image to be printed on various types of recording medium. According to the following description, a case where a tape medium is used as the recording medium will be described.

A data structure of the proprietary data will be described. The proprietary data includes medium information, base image data, object information, and object image data. The medium information is information concerning a tape medium on which printing is executed using the proprietary data. Examples of the medium information includes a width, a length, a color of the tape medium, a color of letters/characters to be printed on the tape medium. Specifically, the width and the length are indicated by numerical values of which unit is millimeter. The base image data is image data for forming patterns/designs to be printed on the tape medium as a background image. The object information is information concerning object(s) arranged within a partial area of the background image. It is noted that a plurality of objects may be arranged within a background image area. The object may include image objects in which images represented by object image data are arranged, and text objects in which texts represented by text data are arranged. Each object may be associated with object information. The object information may include information identifying whether the object is an object image or object text, a location of the object and information specifying the size of the object. The object information of the image object may include designating object image data. The information of the text object may include text data, font information identifying the font used for the text object, and text arrangement information specifying the arrangement of the text in the text object. The text arrangement information may information specifying text alignment position designating how to align the text.

The memory 74 may be a computer-readable storage medium. Examples of such a storage medium are a ROM (read only memory), a RAM (random access memory), a flash memory, a hard disk, which are non-transitory storage memories. It is noted that electrical signals carrying a program downloaded from a server on the Internet or the like are not included in the non-transitory storage medium.

Configuration of Control Server

The control server 100 includes a network interface 162 and a control unit 170. The control unit 170 has a CPU 172 and a memory 174. The memory 174 may be a computer-readable storage medium, similarly to the memory 74 of the communication apparatus 10. The memory 174 stores programs 175. The CPU 172 executes various processes in accordance with the programs 175. The programs 175 include the particular operating system 180, a Web-API server program 181, a JavaScript® program 182, a deciphering program 183 and various types of page screen data 185.

In the memory 174, the proprietary data, the file name of the proprietary data and preview image data of the proprietary data may be registered in advance, by an administrator of the Web-API without executing a registration process which will be described later. The preview image data is image data which is used to form an image, in which an object image included in the object image data and an object text included in the text data are arranged on a background image based on the base image data in accordance with the object information. The preview image data is data having generally used format which can be read and displayed by the communication apparatus 10. The preview image data may be image data to which a transparency process is applied in order to imitate appearance of the tape medium when the preview image is displayed, which will be described later. It is noted that the proprietary data ID information and the file name corresponding to the preliminarily registered proprietary data may be stored, in advance, in the second storage server 300. It is also noted that, in the memory 174, the proprietary data, the file name of the proprietary data and the preview image data of the proprietary data may be stored in accordance with the registration process, which will be described later. It is further noted that, in the memory 174, replacement object data which will be described later, and proprietary data generated by the deciphering program 183 may be stored.

The Web-API server program 181 is a program for configuring the Web-API server, which realizes the Web-API, on the control server 100. The Web-API is an API enabling the client device to use the deciphering program 183 through the Internet 6.

The specific operating system 180 is an operating system on which the deciphering program 183 can be executed. An example of the specific operating system 180 is Microsoft Windows® (registered trademark of Microsoft Corporation). The specific operating system 180 includes an HTTP server program 184. The HTTP server program 184 is a program for configuring the HTTP server in the control server 100 so that the HTTP request from the client apparatus can be received and the HTTP communication can be executed. The HTTP server passes over information based on the HTTP request to the Web-API if the received HTTP request is one designating the Web-API. The HTTP request designating the Web-API may be, for example, one transmitted by a Web browser in which a URL corresponding to the Web-API to the HTTP server. The Web-API obtains the information contained in the HTTP request which is the request the HTTP server received from the client device, and controls the deciphering program 183 in accordance with the obtained information and the specification of the deciphering program 183. With this configuration, it becomes possible that the Web-API server causes the deciphering program 183 to process various pieces of data in accordance with the HTTP request from the client devices. Further, the Web-API server is capable of using the HTTP server such that the information generated by the deciphering program 183 is transmitted to the client device as an HTTP response. An example of such a client device is the communication apparatus 10.

The various types of page screen data 185 is data used to display various types of page screens for displaying information proprietary data on the Web browser provided to respective client devices and acquiring user input therefrom. The various types of page screen data 185 may include information for displaying buttons, text boxes, texts and frames on the respective ones of the various types of page screens, IDs for identifying respective displaying components, information for switching display within each of the page screens. The various types of page screen data 185 may be data which is a combination of a plurality of pieces of HTML (hypertext markup language) format data and a plurality of pieces of CSS (cascading style sheets) format data. It is noted that the various types of page screen data 185 may include URLs for JavaScript used in each of the various types of page screens.

The JavaScript program 182 is incorporated in the Web browser, and enables the client device to execute various processes (e.g., reception of input of modification information) regarding the proprietary data. The JavaScript program 182 is written in the JavaScript which is an object-oriented scripting language. The JavaScript program 182 is an example of proprietary data editing program. When the URL for the JavaScript is included in the page screen data 185 obtained by the Web browser, the Web browser downloads the JavaScript in accordance with the URL, thereby a process being executable in accordance with the downloaded JavaScript. The JavaScript program 182 may be distinctive program modules respectively for the plurality of Web page screens, or commonly used program modules which are commonly used among a plurality of Web pages screens. It is noted that the various types of page screen data 185 and/or the JavaScript program 182 needs not necessarily be stored in the control server 100.

The deciphering program 183 is an SDK (software development kit) which has been developed to generate various pieces of data by deciphering proprietary data. The proprietary data has an original file format and cannot be processed (e.g., edited) unless the structure of the original file format. With use of the deciphering program 183, the user can process (e.g., edit) the proprietary data without considering the file format thereof. Further, the deciphering program 183 is a program it only runs on the specific operating system 180. Furthermore, the deciphering program 183 can be used only from programs which run on the specific operating system on which the deciphering program 183 is also running. Therefore, it is necessary that the Web-API server program 181 runs in the device where the deciphering program 183 is running, and on the specific operating system on which the deciphering program 183 is running. The deciphering program 183 may be configured to process the proprietary data stored only in the device in which the deciphering program 183 is running.

Configuration of First Storage Server

The first storage server 200 has a network interface 262 and a control unit 270. The control unit 270 has a CPU 272 and a memory 274. The memory 274 may be a computer-readable storage medium similarly to the memory 74. The memory 274 stores a program 275. The CPU 272 executes various processes in accordance with the program 275. The memory 274 also stores registered proprietary data which is registered in a registration process through the communication apparatus 10, replacement object image data which is registered by replacement of the object image in an editing screen (described later), completion proprietary data (described later) and file name of each pieces of data, and the like.

The replacement object image data and the completion proprietary data may be automatically deleted when a predetermined period of time has elapsed. For example, the predetermined period may be one day. It is noted that the proprietary data and file names thereof may be registered with the memory 274 by the administrator of the first storage server 2000, without by the registration process described later. It is noted that proprietary ID information and file names corresponding to the proprietary data, which has already been registered, may be stored in the second storage server 300 by the administrator. The proprietary data and the replacement object image data may be stored in different storage folders, respectively.

Configuration of Second Storage Server

The second storage server 300 has a network interface 362 and a control unit 370. The control unit 370 has a CPU 372 and a memory 374. The memory 374 may be a computer-readable storage medium similarly to the memory 74. The memory 374 stores a program 375. The CPU 372 executes various processes in accordance with the program 375. The memory 374 stores various pieces of information such as file names of the proprietary data, characteristic information which is generated as the deciphering program 183 processes the proprietary data, media information and object information, and location information of preview image data which is generated as the deciphering program 183 processes the proprietary data, in association with proprietary data ID identifying the proprietary data. In the following description, the proprietary data ID and information stored in the memory 374 in association with the proprietary data ID will also be referred to as proprietary data general information.

The characteristic information is information representing various types of characteristics for entire proprietary data corresponding to the characteristic information. For example, the characteristics may include a type of language the proprietary data is directed to, a purpose of usage of the proprietary data and the like. The media information is information representing characteristic of the tape medium which the proprietary data is directed to. For example, the characteristics of the proprietary data may include a type of the medium, a width, a length, a color of the tape medium, a color of the text and the like. Regarding the width and the length, numerals of which, unit is millimeter, indicating the width and the length may be included. Further, information indicating categorization (e.g., large, medium and small) of the width and the length may also be included.

The proprietary data general information is data having generally used format so that the communication device 10 is capable of retrieve and use the same. It is noted that, when the proprietary data is registered with the communication system 2 in accordance with a registration process (described later), the proprietary data ID generated by the program 375 when the registration is executed may also be stored. Optionally, file names which are generated by the Web-API server when the registration process is executed may also be stored. Further optionally, when the proprietary data has already been stored in the communication system 2, the proprietary data ID, file names, characteristic information, media information, object information and location information of the preview image data, which are determined without executing the registration process, by the administrator of the second storage server 300.

It is noted that, in the following description, a recitation that "the CPU 172 of the control server 100 receives the various types of information" includes a situation where "the CPU 172 of the control server 100 obtains the various types/pieces of information through the network interface 162." Similarly, a recitation that "the CPU 172 of the control server 100 transmits various types of information" includes a situation where "the CPU 172 of the control server 100 outputs various types/pieces of information through the network interface 162." It is further noted that, although repeated, the above applies to recitations of the CPU 272 and the network interface 262 of the first storage server 200, the CPU 372 and the network interface 362 of the second storage server 300, and the CPU 72 and the network interface 86 of the communication apparatus 10.

In this specification, the term "information" is used to mean higher concept of "data." Therefore, it is possible to use "information A" instead of "data A." Further, a plurality of pieces of "information" could be regarded as the same "information" even if the formats of a plurality of pieces of "data" corresponding to the plurality of pieces of "information" are different (e.g., the text format, the binary format, the flag format, etc.) as long as the content of the "data" is the same. For example, text format data "COPY=2" and binary format data "10" are treated as the same "information" as long as the apparatus treated the above two pieces of data as information representing the number of copy is two.

In this specification, the control server 100, the first storage server 200 and the second storage server 300 are interconnected through the Internet 6, and they are arranged at physically different positions. It is only an exemplary configuration, and the configuration needs not be limited to such an arrangement. For example, the control server 100, the first storage server 200 and the second storage server 300 may be realized by a single server apparatus. In such a case, a program causing the server apparatus to serve as the control server 100, a program causing the server apparatus to serve as the first storage server 200, and a program causing the server apparatus to serve as the second storage server 300 are executed in the server apparatus, and communication among the programs is executed through bus lines inside the server apparatus.

When the control server 100, the first storage server 200 and the second storage server 300 may be realized by a single server apparatus, communications which are described, in the specification, as ones among the control server 100, the first storage server 200 and the second storage server 300 may be replaced with ones function among the program functioning as the control server 100, the program functioning as the first storage server 200 and the program functioning as the second storage server 300. Alternatively, a program functions as the control server 100, the first storage server 200 and the second storage server 300 may be executed in the single server apparatus. In such a modified configuration, the communications described as communications among the control server 100, the first storage server 200 and the second storage server 300 may be replaced with exchange of data in the program which functions as the control server 100, the first storage server 200 and the second storage server 300.

Registration Process

The registration process is for preliminarily registering proprietary data and data related to the proprietary data in the first storage server 200 and/or the second storage server 300. The registration process may be executed by a distributor of the Web browser program 77.

Figure 2:
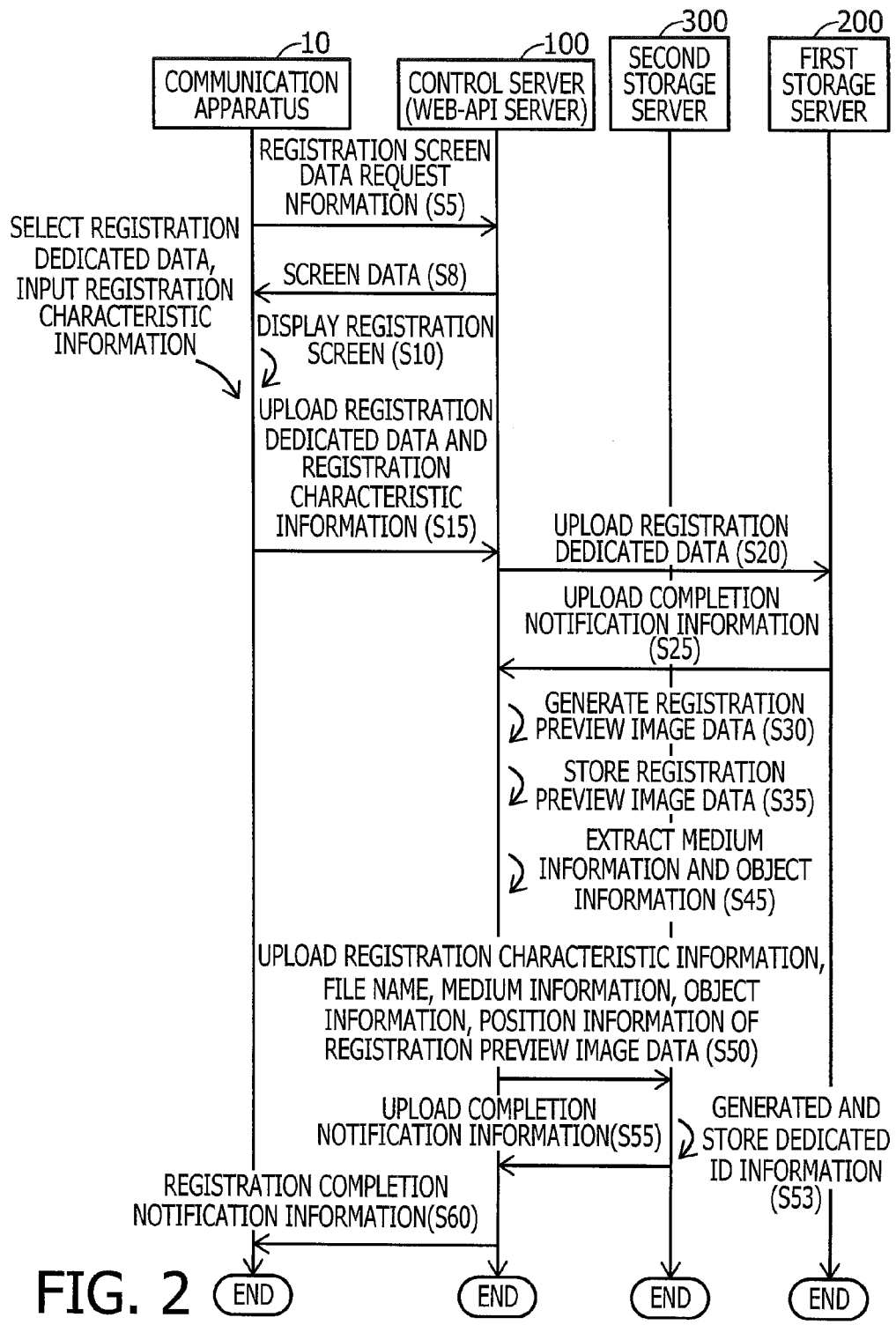
FIG. 2 shows a sequence chart illustrating processes executed by respective apparatuses according to the illustrative embodiment.
Figure 3:
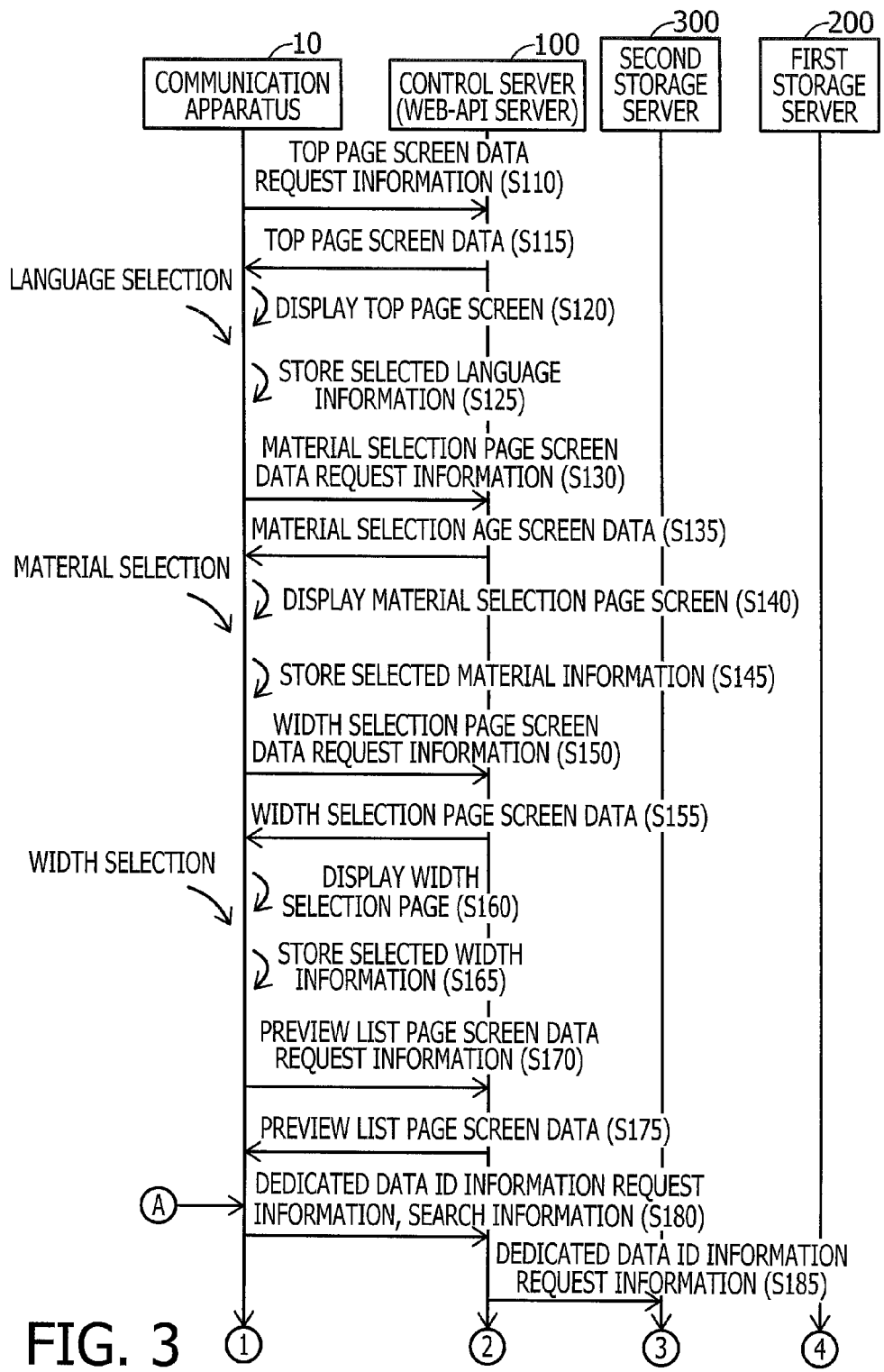
FIGS. 3-7 show sequence charts illustrating processes executed by respective apparatuses according to the illustrative embodiment.
Figure 4:
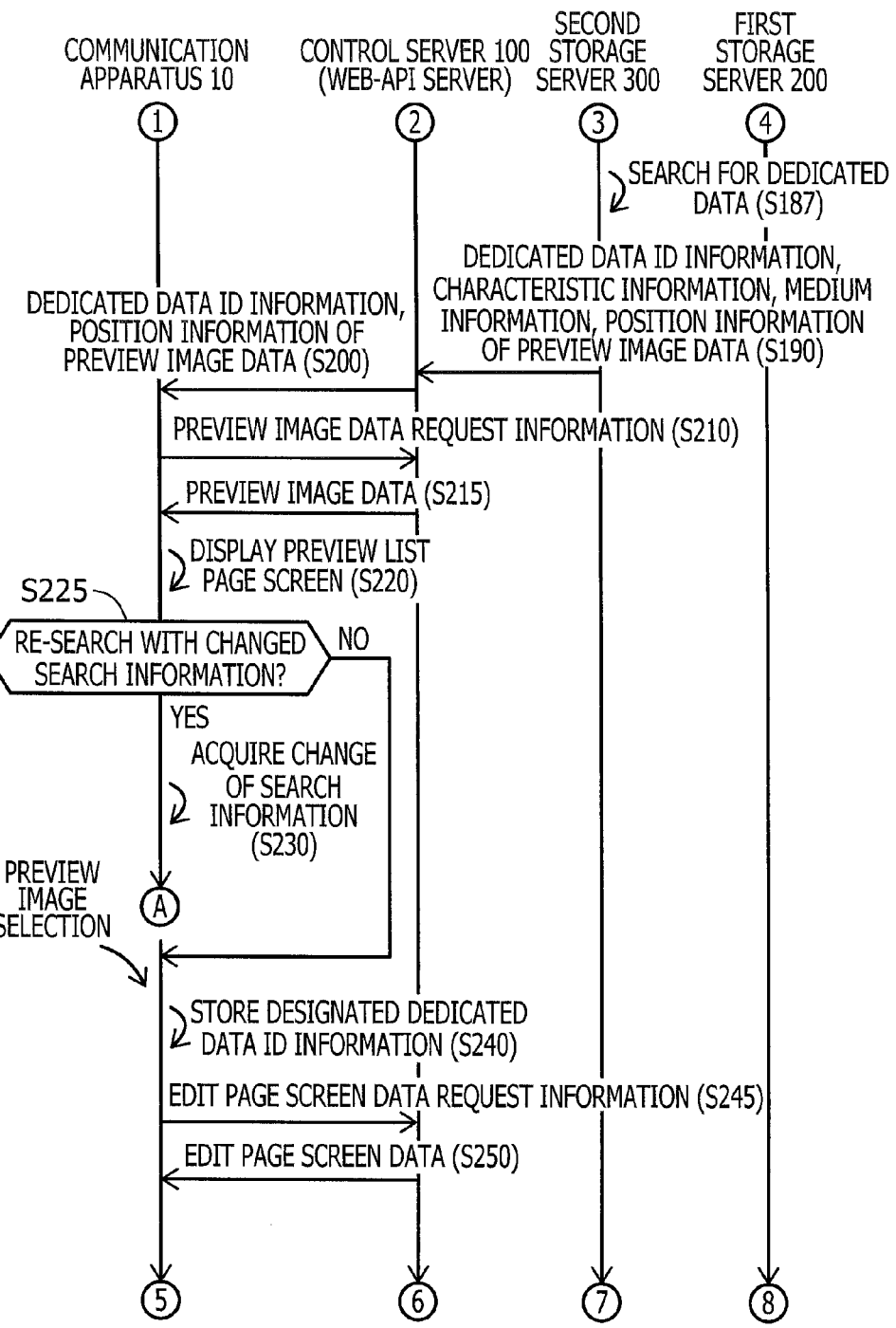
Figure 5:
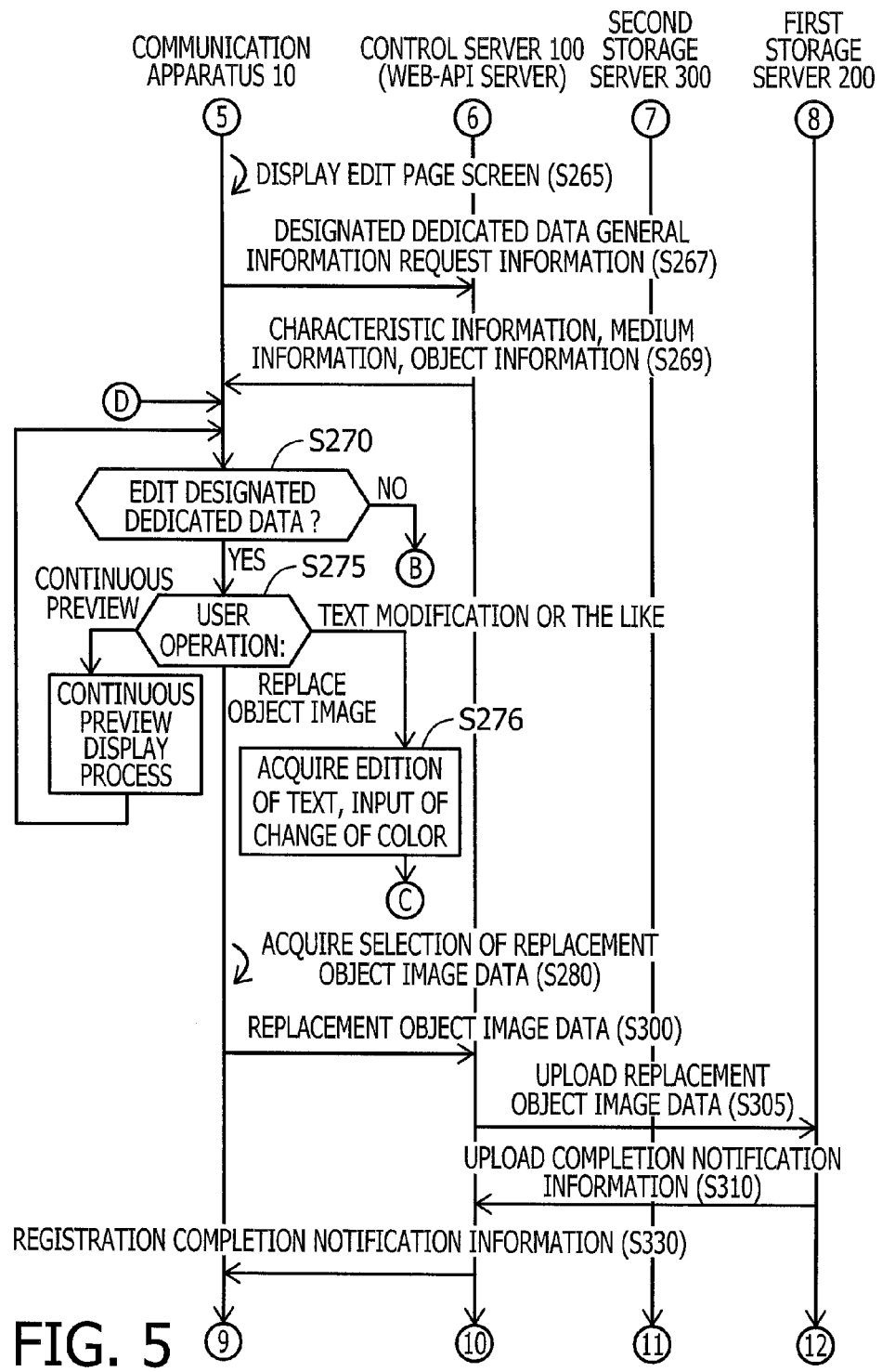
Figure 6:
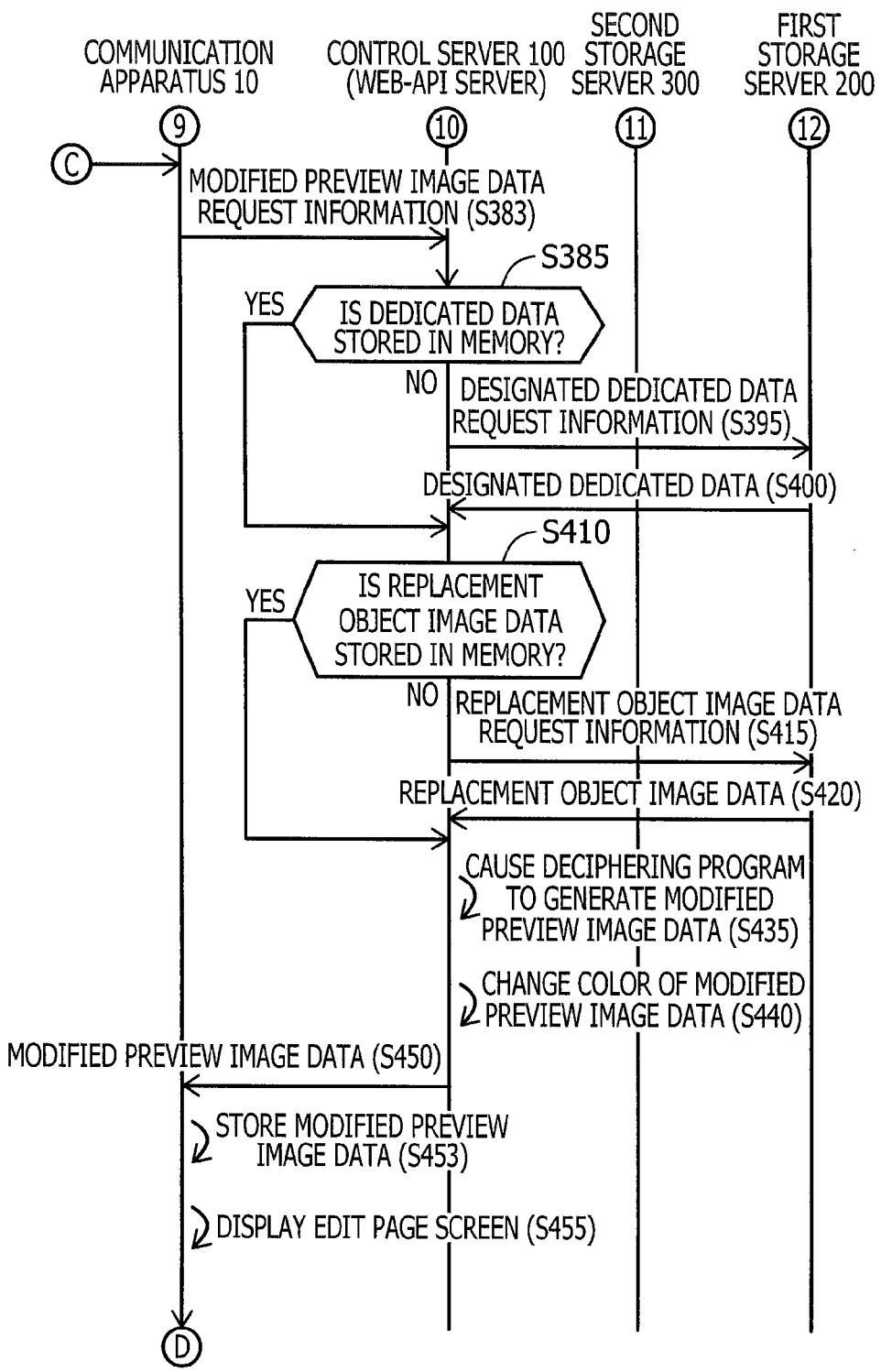
Figure 7:
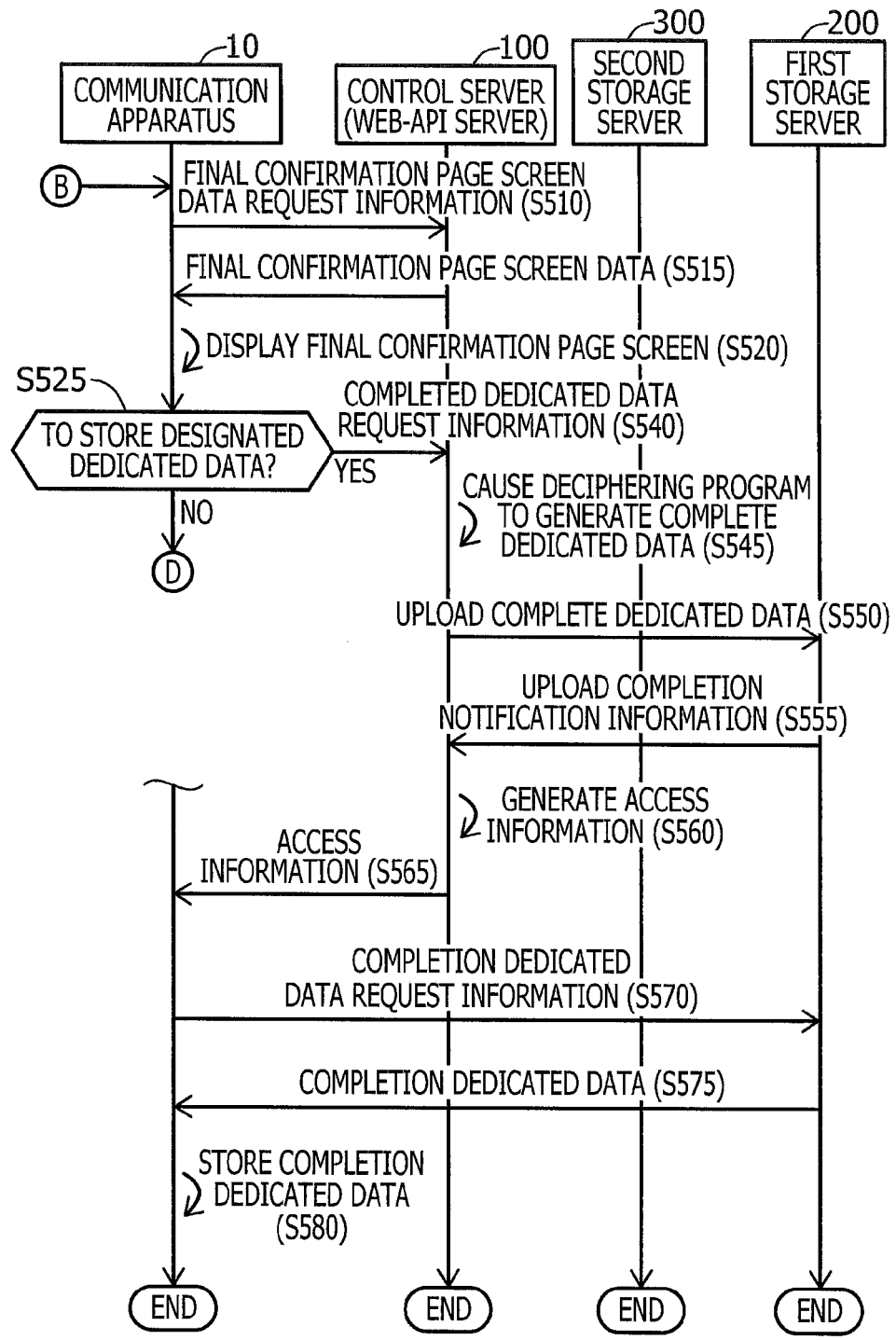

In FIG. 2, when a URL (uniform resource locator) of the registration screen data is input in the Web browser, the CPU 72 of the communication apparatus 10 transmits registration screen data request information to the control server 100 as an HTTP request in accordance with the input URL in S5. The registration screen data request information is information for requesting the control server 100 for the registration screen data which is used to display a registration screen on the display unit 82. In S5, the CPU 72 receives the registration screen data which is transmitted by the HTTP server of the control server 100. The registration screen data is one type of screen data stored in the control server 100, and includes a URL of the JavaScript program 182 necessary for the registration screen. It is noted that various types of screen data described hereinafter the Web browser uses to display various screens on the display unit 82 are screen data stored in the control server 100 and each screen data includes a URL of a JavaScript program 182 necessary for each screen.

In S10, the CU 72 displays the registration screen on the display unit 82 based on the registration screen data. The registration screen is a screen for executing a process of selecting proprietary data to be registered with the first storage server 200 and a process of acquiring a user input of characteristic information representing the characteristics of the proprietary data to be registered. The user operates the operation unit 84 to select the registration proprietary data which is subjected to be registered and the registration characteristic information representing the characteristic information of the registration proprietary data.

In S15, the CPU 72 obtains the registration characteristic information input by the user, and uploads the registration proprietary data and registration characteristic information to the control server 100. It is noted that step S15 should use an API provided by the Web-API server configured by the Web-API server program 181, and thus, executed in accordance with the downloaded JavaScript program 182. The JavaScript program is associated with IDs of displayed components displayed inside the screen which is displayed by the Web browser and information to be transmitted to the Web-API server. The JavaScript program obtains the information input through the screen, and generates request information for requesting respective request information including the obtained information. After the JavaScript program 182 inputs the URL to use the Web-API server and the various types of request information to the Web-API server, the Web browser transmits the various types of request information to the Web-API server based on the URL.

In S20, the Web-API server of the control server 100 generates a file name which uniquely identifies the proprietary data. Next, the Web-API server uploads the registration proprietary data to the first storage server 200. When uploading, the Web-API server requires the first storage server 200 to store the registration proprietary data in the storage folder for the proprietary data with the generated file name. In S25, the Web-API serer receives upload completion notifying information which notifies completion of the upload from the first storage server 200. It is noted that, in S20, the Web-API server may store the registration proprietary data with the generated file name in the storage folder for the proprietary data defined in the memory 174.

In S30, the Web-API server makes the deciphering program 183 process the registration proprietary data to generate registration preview image data which is preview image data of the registration proprietary unit. In S35, the Web-API server stores the registration preview image data in the storage folder for the preview image data, which is in the memory 174, with the generated file name.

In S45, the Web-API serve makes the deciphering program 183 decipher the registration proprietary data obtained in S15, and extract medium information and object information. It is noted that each of the medium information and the object information generated in S45 is information having a general-purpose information format which the communication apparatus 10 can read and recognize as information. Further, the object information concerning the image object generated in S45 does not include information identifying the object image data. It is because the communication apparatus 10 cannot use the object image data even if the object image data in the proprietary data is identified.

The Web-API server uploads, in S50, the registration characteristic information received in S15, the file name generated in S20, the medium information and the object information generated in S45, and location information of the registration preview image data which is combined information including the file name generated in S20 and the location information of the storage folder of the preview image data to the second storage server 300. The location information of the registration preview image data may be a new URL which is a combination of the URL of the storage folder of the preview image data and the generated file name.

In S53, the CPU 372 of the second storage server 300 generates proprietary ID information for uniquely identifying the proprietary data and the proprietary data general information. The proprietary data ID information may be, for example, a serial number. The CPU 372 stores registration proprietary data general information in association with the generated proprietary ID information in the memory 374. It is noted that the registration proprietary data general information is proprietary data general information including received registration characteristic information, the file name, the medium information, the object information and the location information of the registration preview image data.

In S55, the CPU 372 transmits upload completion notification information for notifying completion of upload to the control server 100. In S60, the Web-API serer transmits registration completion notification information for indicating completion of registration of the registration proprietary data to the communication apparatus 10. Thereafter, the process is terminated.

Operation of Communication System

An operation of the communication system will be described referring to sequential charts shown in FIGS. 3-7. When the URL of the top page screen data is input in the Web browser, the CPU 72 of the communication apparatus 10 transmits top page screen data request information, which is information for requesting the top page screen data, to the control server 100 in accordance with the URL in S110. In S115, the CPU 72 receives the top page screen data transmitted by the HTTP server of the control server 100.

The top page screen data contains information for displaying buttons designating a material selection page screen and a width selection page screen, a preview list page screen. The buttons are associated with URLs of the page screen data 185 for displaying the page screens corresponding to the buttons, respectively. As above, when a button is operated on the Web browser, the corresponding page screen data 185 is obtained based on the URL and displayed.

In S120, the CPU 72 causes the display unit 82 to display the top page screen based on the top page screen data. The top page screen is a screen for acquiring a user selection of a language. It is noted that the information representing the user selection should be stored in the storage area of the memory 74 so that the information could be used in page screens other than the top page screen. A process of storing the various pieces of information in the storage area is executed in accordance with the downloaded JavaScript program 182. When the user operates the operation unit 84 to select a type of the language, the CPU 72 stores selection language information indicating the selected language in the storage area of the memory 74. Example of the languages are Japanese, English and the like in S125.

When display of the material selection page screen is instructed, the CPU 72 transmits the material selection page screen data request information to the control server 100 based on the URL in S130. Then, in S135, the CPU 372 receives the material selection page screen data from the control server 100.

In S140, the CPU 72 causes the display unit 82 to display the material selection page screen in accordance with the material selection page screen data. The material selection page screen is a screen for acquiring user selection of the material for the tape medium. Examples of the material are an adhesive OPP (oriented poly propylene) tape, a non-adhesive ribbon, a non-adhesive craft tape and the like. When the user operates the operation unit 84 to select material the user wants to use, in S145, the CPU 72 stores selection material information representing the selected material in the storage area of the memory 74 in accordance with the downloaded JavaScript program 182.

When display of the width selection page screen is instructed, in S150, the CPU 72 transmits the width selection page screen data request information to the control server 100 in accordance with the URL. The width selection page screen data request information is information for requesting the control server 100 for the width selection page screen data used to display the width selection page screen on the display unit 82. In S155, the CPU 72 receives the width selection page screen data from the control server 100.

In S160, the CPU 72 causes the display unit 82 to display the width selection screen based on the width selection page screen data. The width selection page screen is a screen for acquiring a user selection of the width of the tape medium. When the user operates the operation unit 84 and selects the desired width, the CPU 72 stores selection width information representing the selected width in the storage area of the memory 74 in accordance with the downloaded JavaScript program 182 in S165.

When display of the preview list page screen is instructed, the CPU 172 transmits the preview list page screen data request information to the control server 100 in S170 based on the URL. The preview list page screen data request information is information for requesting the control server 100 for the preview list page screen data which is for displaying the preview list page screen on the display unit 82. In S175, the CPU 72 receives the preview list page screen data from the control server 100. It is noted that the preview image data is not included in the preview list page screen data.

In S180, the CPU 72 retrieves the selection language information obtained in S125, the selection material information obtained in S145, the selection width information obtained in S165 form the storage area of the memory 74 in accordance with the downloaded JavaScript program 182, and generates search information included the respective information. Then, the CPU 172 transmits the proprietary data ID information request information and the search information to the Web-API server. It is noted that various page screen data 185 for selecting the selection language information, the selection material information and the selection width information includes information for displaying respective selection candidates having appropriate value ranges, respectively. Therefore, the search information includes appropriate information regarding search conditions for searching proprietary data. An example of search conditions includes a condition showing "long," "medium" and "short" regarding the width and length of the tape. Another example of such a condition is one showing one of a plurality of languages usable for the tape medium.

In S185, the CPU 172 of the control server 100 transmits the proprietary data ID information request information to the second storage server 300. In S187, the CPU 372 of the second storage server 300 compares information included in a plurality of pieces of the proprietary data general information stored in the second storage server 300 with the search information to search proprietary data having the language information, the material information and the width information which meet the searching condition. In S190, the CPU 372 the proprietary data ID information and corresponding characteristic information, medium information and location information of the preview image data of the proprietary data that meets the searching condition to the control server 100. In S200, the CPU 172 transmits the obtained proprietary data ID information and the location information of the corresponding preview image data to the communication apparatus 10.

In S210, the CPU 72 of the communication apparatus 10 transmits the preview image data request information, which is information for requesting for the preview image data based on the location information of the preview image data received in S200, to the control server 100 in accordance with the JavaScript program 182. In S215, the CPU 172 of the control server 100 transmits the preview image data which is subjected to be obtained with the preview image data request information to the communication apparatus 10. It is noted that the CPU 172 may transmit the preview image data corresponding to the proprietary data ID information in S200 to the preview image data communication apparatus 10. In such a case, steps S210 and S215 are unnecessary.

In S220, the CPU 72 causes the display unit 82 to display the preview list page screen based on the preview list page screen data. Further, the CPU 72 synthesizes a preview image on the preview list page screen based on the preview image data obtained in S215 in accordance with the JavaScript program 182. It is noted that the CPU 72 temporarily stores information which relates the proprietary data ID information corresponding to the review image data with the preview image displayed on the preview list page screen based on the respective preview image data in the memory 74 in accordance with the JavaScript program 182.

Figure 8:
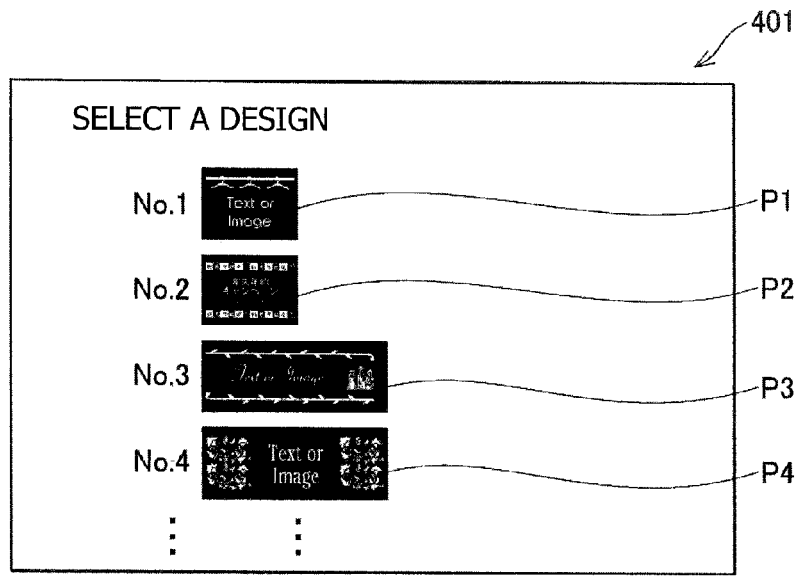
FIG. 8 is an example of a preview list page screen according to the illustrative embodiment.

FIG. 8 shows an example of the preview list page screen 401. The preview list page screen 401 includes preview images P1-P4. The preview images P1-P4 are images for acquiring user selection of the preview image. The user operates the operation unit 12 to select a preview image subjected to be edited from among the preview images P1-P4. The preview images displayed on the preview list page screen may be called as thumbnail images. The CPU 72 stores the preview image data in the storage area of the memory 74 in accordance with the JavaScript program 182 so that they can be used in another screen.

In S225, the CPU 72 acquires a user selection of re-searching for proprietary data that meets the searching information after modifying the searching information. When it is determined that the user selects re-searching (S225: YES), the process proceeds to S230. In S230, the CPU 72 acquires a user input of modifying at least a part of the selection language information, the selection material information and the selection width information. Thereafter, the process proceeds to S180.

When it determines that user does not select researching (S225: NO), the CPU 72 acquires a user operation to select one of the plurality of preview images displayed in the preview list page screen. When the user operates the operation unit 84 to select one of the preview images, the CPU 72 temporarily stores the designated proprietary data ID information which is the proprietary data ID information corresponding to the selected (designated) preview image in accordance with the JavaScript program 182.

In S245, the CPU 72 transmits the edit page screen data request information to the control server 100 in accordance with the JavaScript program 182. The edit page screen data request information is information for requesting the server 100 for the edit page screen data which is for displaying the edit page screen on the display unit 82. The edit page screen is a screen for editing designated proprietary data which is identified by the designated proprietary data ID information.

In S250, the CPU 172 of the control server 100 transmits the edit page screen data to the communication apparatus 10. In S265, the CPU 72 causes the display unit 82 to display the edit page screen based on the edit page screen data. Further, the CPU 72 synthesizes the edit page screen with the preview image P11, which is an image based on the preview image data corresponding to the designated proprietary data ID information among the preview image data obtained in S215, in accordance with the JavaScript program 182. In S267, the CPU 72 requests the Web-API server for the designated proprietary data general information request information in accordance with the JavaScript program 182. The designated proprietary data general information request information includes the designated proprietary data ID information. In S269, the CPU 72 obtains the characteristic information, the medium information and the object information, which are corresponding to the designated proprietary data ID transmitted from the Web-API server.

Figure 9:
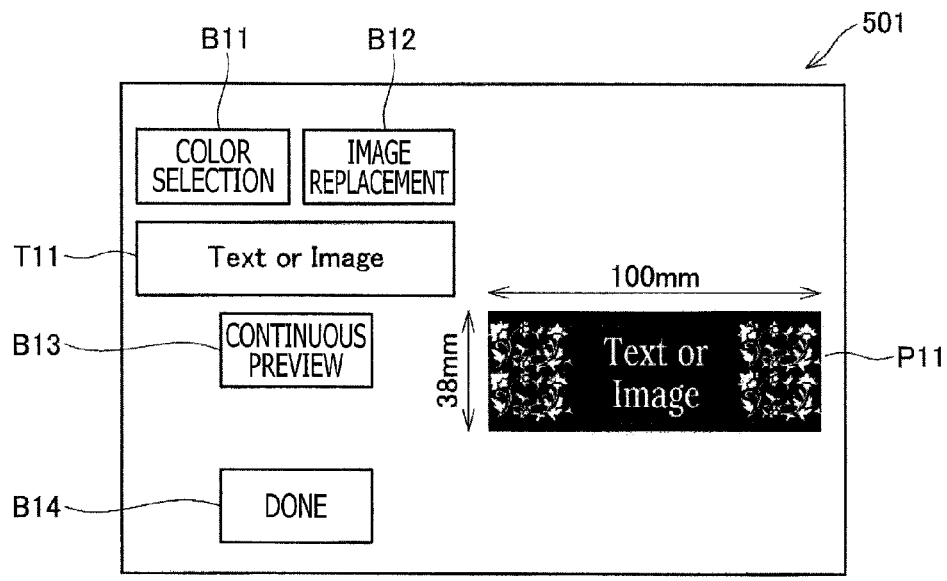
FIG. 9 is an example of an edit page screen according to the illustrative embodiment.
Figure 10:
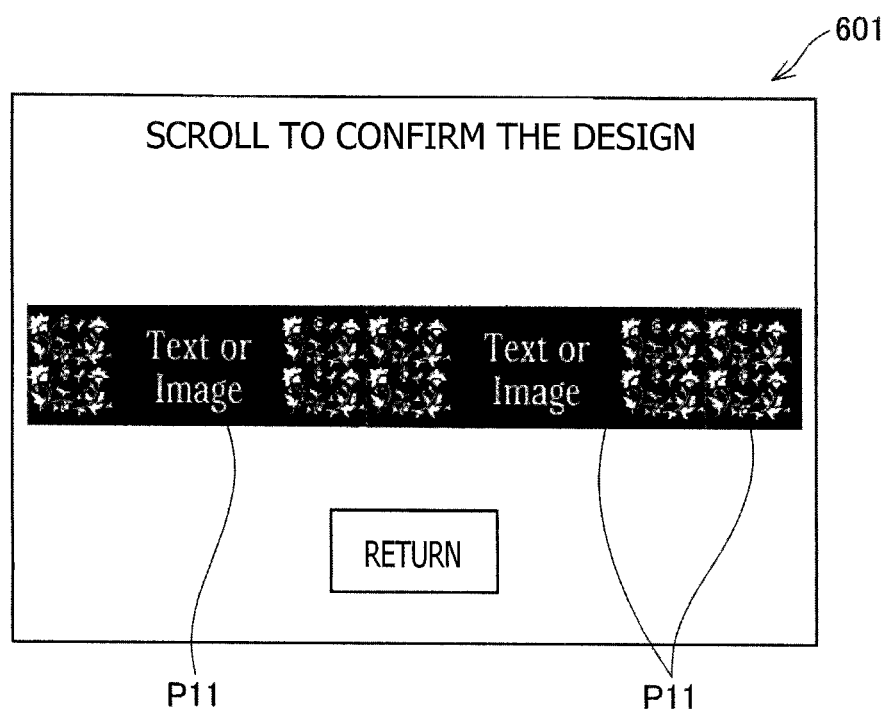
FIG. 10 is an example of continuous preview displaying screen according to the illustrative embodiment.

FIG. 9 shows an example of the edit page screen 501. The edit page screen 501 has a preview image P11, the text box image T11 and button images B11-B14. It is noted that the edit page screen data configured such that the button image B14 is associated with the URL of the final confirmation page image data, which will be described later. The preview image P11 is a preview image of the proprietary data subjected to be edited. The text box image T11 is an image for acquiring input/modification of the text displayed in the preview image P11. The button image B11 is an image for acquiring modification of the tape color and color of text of the preview image. The button image B12 is an image for acquiring an instruction to replace an object in the preview image P11. The instruction to replace the object is an instruction to arrange an object image based on other object image data within an area where an object image based on the object image data or an object text based on the text data is arranged.

Further, the CPU 72 identifies areas where the text object and the image object are arranged based on the object information, and displays rectangular images indicating respective areas. With this configuration, the user is capable of recognize the areas where the objects area arranged. The button image B13 is an image for acquiring execution instruction of continuous preview displaying process. The continuous preview display instruction is an instruction to display continuous preview in which the preview images area continuously formed. By the continuous preview, it becomes possible to a state where images are continuously formed on the tape medium. The button image B14 is an image for acquiring an instruction to terminate the editing process.

A process of synthesizing the edit page screen with the preview image P11 will be described in detail. The CPU 72 obtains tape medium image file for forming an imitating image of the tape medium from the control server 100 or not-shown server apparatus, in accordance with the JavaScript program 182. Then, the CPU 72 displays a preview image which is formed based on the designated preview image data on the preview image of the tape medium which is formed based on the tape medium image file in an overlapped manner. The preview image which is drawn based on the designated preview image data is formed such that the background image is transparent, it is possible to imitate a state where the image formed based on the designated proprietary data is formed on the tape medium.

In S270, the CPU 72 acquires a user selection as to whether the designated proprietary data is to be edited. When a text box image T11 or one of button images B11-B13 is selected (S270: YES), the process proceeds to S275. In S275, the CPU 72 determines the substance of the user operation. When the button image B13 is selected (S275: continuous preview), the process proceeds to S277.

In S277, the CPU 72 executes the continuous preview display process in accordance with the JavaScript program 182. An example of a continuous preview display screen 601, which is displayed in the continuous preview display process, is shown. In the continuous preview display screen 601, the similar preview images P11 are displayed continuously. As another example, the continuous preview display process may display a plurality of preview images P11 in a continuously arranged manner, based on the preview image data stored in the storage area of the memory 74. After execution of S277, the process returns to S270.

In S275, when a text box image T11 is focused for input after the text object in the preview image P11 is selected, or when the button image B11 is selected (S275: text modification), the process proceeds to S176. In S276, the CPU 72 acquires input to edit the text inside the text box image T11, change of the color of the preview image and/or change of the color of the characters. When the text box is not focused any more as the input subject, or input to change the color of the tape a(end event) is and/or the color of the characters of the preview image has been finished, the event detected by the JavaScript program 182, and the process proceeds to S383.

In S275, when the button image B12 is selected (S275: replacement of object image), the process proceeds to S280. In S280, the CPU 72 executes a process having the user select replacement object image data which is object image data for replacement. the replacement object image data may be selected from among a plurality of pieces of image data stored in the memory 74 of the communication apparatus 10. When an event to acquire the user input of selecting the replacement object image data is detected by the JavaScript program 182, the CPU 72 obtains the replacement object image data, and transmit the same to the Web-API server in S300, in accordance with the JavaScript program 182.

In S305, the Web-API server generates a file name which uniquely identifies the replacement object image data. Then, the Web-API server uploads the replacement object image data to the first storage server 200. In this uploading process, the Web-API server requests the first storage server 200 to store the object image data in the storage folder with the file name generated in S305. In S310, the Web-API server receives upload completion notification information notifying completion of uploading from the first storage server 200.

It is noted that the Web-API serer may store the replacement object image data in the storage folder of the object image data in the memory 174 with the file name generated in S305.

In S330, the Web-API server transmits the registration completion notification information, which includes the file name of the replacement object image data, to the communication apparatus 10. Accordingly, the file name of the replacement object image data is ID information used to designate the replacement object image data when the communication apparatus 10 requests the Web-API server for the replacement object image data.

In S383, the CPU 72 transmits the modified preview image data request information to the control server 100 in accordance with the JavaScript program 182. In S275, when text editing and/or color changing is executed (S175: text modification), the CPU 72 requests the control server 100 for the modified preview image data by transmitting the modified preview image data request information. In this case, the CPU 72 changes the text data contained in the object information stored in the storage area of the memory 74 to text data for drawing text input in the text box in accordance with the JavaScript program 182. When the color is changed, the CPU 72 changes information designating the tape color and/or character color of the based image data contained in the medium information stored in the storage are of the memory 74 to information designating the input color. Further, when the object image is replaced in S275 (S275: replacement of object), the CPU 72 adds the file name of the object image data corresponding to the object image to replace the previous image in the object information stored in the storage area of the memory 74 in accordance with the JavaScript program 182.

The modified preview image data request information contains, as the modification information indicative of the modification contents, the modified object information, the modified medium information, and the proprietary data ID information of the designated proprietary data. It is noted that the process in S383 may be realized by a function which is provided by the Web-API server configured by the Web-API server program 181.

In S385, the CPU 172 determines whether the proprietary data identified by the proprietary data ID information obtained in S383 is stored in the memory 174. When the CPU 172 determines that the proprietary data is stored (S385: YES), the process proceeds to S410. When the CPU 172 determines that the proprietary data identified by the proprietary data ID information is not stored (S385: NO), the process proceeds to S395. For example, when the proprietary data ID information of the proprietary data which has been stored, in advance, by the administrator of the Web-API server is obtained in S383, the determination in S385 is "YES." For another example, when the designated proprietary data is obtained from the first storage server in S400 (described later) and then stored in the memory 174, and the same proprietary data ID information is obtained in the next execution of S383, the determination in S385 is "YES."

In S395, the CPU 172 transmits the designated proprietary data request information to the first storage server 200. The designated proprietary data request information is information for requesting the first storage server 200 for the designated proprietary data which is identified by the proprietary data ID information. The designated proprietary data request information may include the proprietary data ID information. In S400, the CPU 172 obtains the designated proprietary data from the first storage server 200. Further, the CPU 172 stores the obtained designated proprietary data in the memory 174. With this configuration, it becomes possible to store the data which is to be processed by the deciphering program 183 in S435 can be stored in the memory 174. Therefore, even if the deciphering program 183 is a program which can process only the data stored inside the control server 100 in which the deciphering program 183 runs, the data can be processed by the deciphering program 183.

In S410, the CPU 172 determines whether the replacement object image data, which is identified by the file name of the object image data corresponding to the replacement object image obtained in S383, is stored in the memory 174. If stored (S410: YES), the process proceeds to S436. If not stored (S410: NO), the process proceeds to S415. For example, when the replacement object image data stored in the memory 174 when the file name is generated in S305 is retained in the memory 174, the determination in S410 is "YES." For another example, the replacement object image data stored in the memory 174 when the file name is generated in S305 has been deleted, the determination in S410 is "NO."

In S415, the CPU 172 transmits the replacement object image data request information to the first storage server 200. The replacement object image data request information is information for requesting the first storage server 200 for the replacement object image data identified by the replacement object image data ID information. The replacement object image data request information may include the file name of the replacement object image data. In S420, the CPU 172 obtains the replacement object image data from the first storage server 200. Further, the CPU 172 stores the thus obtained replacement object image data in the memory 174. With this configuration, it is possible to store the data to be processed by the deciphering program 183 in S435 in the memory 174.

In S435, the Web-API server causes the deciphering program 183 to process the object information obtained in S383 and the designated proprietary data stored in the memory 174 and identified by the designated proprietary data ID obtained in S383. When the object information obtained in S383 includes the file name of the replacement object image data, the Web-API server also causes the deciphering program 183 to process the replacement object image data stored in the memory 174 and identified by the file name of the replacement object image. By the processes of the deciphering program 183, in correspondence with the designated proprietary data, modified preview image data reflecting modifications input through the editing page screen is generated. It is noted that the preview image data generated by the deciphering program 183 is monochromatic image data.

In S440, the CPU 172 changes the color information of the monochromatic modified preview image data generated in S435 based on the information designating the tape color and character color, which information is included in the medium information obtained in S383. It is noted that the CPU 172 may apply a transmission process to the modified preview image data to spuriously show the texture of the tape medium.

In S450, the CPU 172 transmits the modified preview image data to the communication apparatus 10. In S453, the CPU 72 of the communication apparatus 10 stores the received preview image data in the storage area of the memory 74 in accordance with the JavaScript program 182. Then, in S455, the CPU 72 causes the display unit 82 to display edit page screen which formed by synthesizing the preview image P11 based on the modified preview image data in accordance with the JavaScript program 182. With this configuration, when the changes of the text and/or color is executed in S275, the edit page screen including the preview image in which the text, tape color and/or character color has been changed is re-displayed. When the object image is replaced in S275, the edit page screen including the object image after the replacement is re-displayed. Thereafter, the process returns to S270. Generation of the preview image has be described in S265, it will not be repeated herein for brevity. It is noted that, even if the process returns to S270, the object information after modification, the medium information after modification stored in the storage area of the memory 74 are retained in the memory 74 as they are. That is, after the process returns to S270, the modification in accordance with the modification executed on the edit page screen is further applied to the object information after modification, and the medium information after modification.

In S270, when the button image B14 (see FIG. 9) is selected, it is determined that the editing of the designated proprietary data has been completed (S270: NO), and the process proceeds to S510. In S510, the CPU 72 transmits the final confirmation page screen data request information to the control server 100 in accordance with the URL of the final confirmation page screen data. The final confirmation page screen data request information is information for requesting the control server 100 for the final confirmation page screen data for displaying the final confirmation page screen on the display unit 82. In S512, the CPU 72 receives the final confirmation page screen data from the control server 100.

In S520, the CPU 72 causes the display unit 82 to display the final confirmation page screen based on the final confirmation page screen data. Further, the CPU 72 synthesizes the preview image with the final confirmation page based on the preview image data stored in the storage area of the memory 74 in accordance with the JavaScript. Further, in accordance with the JavaScript, the CPU 72 information representing the tape color, character color, width, length and font with the final confirmation page based on the characteristic information and the medium information stored in the storage area, in accordance with JavaScript. Further, in the final confirmation page screen, a surrounded image indicative of the objects is not displayed. That is, the user can visually recognize the image which looks like one actually printed on the tape, which does not include the surrounded images, together with the information regarding the tape and/or characters.

In S525, the CPU 72 acquires a user selection as to whether the designated proprietary data is stored or not. The acquisition of the user selection may be done with a storage execution button (not shown) which may be provided, for example, on the final confirmation page screen. When the determination is "NO" (S525: NO), the process returns to S270, while when the determination is "YES" (S525: YES), the process proceeds to S540.

In S540, the CPU 72 transmits the completion proprietary data request information to the Web-API server in accordance with the JavaScript. The completion proprietary data request information is information for requesting the control server 100 for completed proprietary data in which all the modifications applied to the designated proprietary data have been reflected. The completion proprietary data request information may include the object information and the medium information to which all the modifications applied to the designated proprietary data have been reflected, that is, the object information, medium information and the designated proprietary data ID information finally used in S383.

In S545, the Web-API server causes the deciphering program 183 to process the object information and medium information obtained in S540, and the designated proprietary data which is stored in the memory 174 and identified by the designated proprietary data ID obtained in S540. When the object information obtained in S540 includes the file name of the replacement object image data, the Web-API server causes the deciphering program 183 to process the replacement object image data stored in the memory 174 and identified by the file name of the replacement object image data. With the above process, the completed proprietary data reflecting all the modifications indicated by the object information and the medium information obtained in S540 is generated.

In S550, the CPU 172 generates the file name uniquely identifying the completion proprietary data. Then, the CPU 172 uploads the completed proprietary data to the first storage server 200. When uploading, the CPU 172 requests the first storage server 200 to store the completed proprietary data with the generated file name in the storage folder for the proprietary data. In S555, the CPU 172 receives upload completion notification information from the first storage server 200. In S560, the CPU 172 generates access information for accessing the completed proprietary data stored in the first storage server 200. The access information may be a new URL by synthesizing the URL of the storage folder for the proprietary data with the generated file name. In S565, the CPU 172 transmits the access information to the communication apparatus 10.

In S570, the CPU 72 of the communication apparatus 10 inputs downloading instruction based on the access information obtained in S565 in the Web browser in accordance with the JavaScript. The Web browser, in accordance with the access information, transmits the completion proprietary data request information which is information for requesting for the completion proprietary data to the first storage server 200. In S575, the CPU 72 downloads the completion proprietary data from the first storage server 200. In S580, the CPU 72 stores the downloaded completion proprietary data in the memory 74. Then, the process is terminated.

The proprietary data is data using an original file format. Therefore, in order to execute an editing process, it is necessary to use the deciphering program 183. The deciphering program 183 is a program which runs only on a particular operation system 180. Therefore, if the operation system 76 of the communication apparatus 10 is different from the particular operating system 180, it is impossible to run the deciphering program 183 on the communication apparatus 10 and thus, there may be a case where the editing of the proprietary data cannot be executed on the communication apparatus 10.

According to the illustrative embodiment, the proprietary data the user designates (S240) using the communication apparatus 10 can be converted to the preview image data having a generally used format in the control server (S435). Then, a process to cause the communication apparatus 10 to obtain the preview image data can be executed in accordance with an HTTP communication (S383). Since the HTTP communication is independent of the type of the operating system, the communication apparatus 10 can executes the editing of the proprietary data on the Web browser.

With the above configuration, it becomes unnecessary to adapt the deciphering program 183 to each of a plurality of types of operating systems, it becomes possible to reduce developing cost of the deciphering program 183 and the load to the maintenance.

According to the control program and the like described above, it is possible to convert, with the control server 100, the proprietary data uploaded (S15) from the communication apparatus 10 to the preview image data having the generally used image format which can be read by the communication apparatus 10 (S30). Further, the preview image data after conversion is stored in advance in the first storage server 200 in association with the proprietary data ID information identifying the uploaded proprietary data (S20). When one of a plurality of pieces of proprietary data stored in the first storage server 200 is selected by the user (S240), it is possible to cause the communication apparatus 10 to obtain the preview image data corresponding to the selected proprietary data from the first storage server 200 (S260).

With the above configuration, even if the editing process to the proprietary data cannot be executed in the communication apparatus 10, it becomes possible to cause the communication apparatus 10 to display an image which will be drawn based on the proprietary data selected by the user.

Therefore, since it is not necessary to adapt the deciphering program 183 to each of various types of operating systems. Accordingly, developing and maintenance cost of the deciphering program 183 can be reduced.

Further, according to the above-described configuration, the proprietary data reflecting the modification (S275) acquired by the communication apparatus 10 is generated by the control server 100 (S545), and the communication apparatus 10 is capable of obtaining the thus generated proprietary data (S575). With this configuration, even if the communication apparatus 10 cannot decipher the proprietary data, it is possible that the communication apparatus 10 acquires the modification instruction, and that the communication apparatus 10 obtains the modified proprietary data having been modified in accordance with the acquired modification instructions.

According to the illustrative embodiment, preview images of the plurality of pieces of proprietary data stored in the first storage server 200 can be displayed by the communication apparatus 10 (S220). Therefore, the user can easily select the desired proprietary data based on the preview images.

According to the illustrative embodiment, the communication apparatus 10 acquires input of search information (S120, S140, S150 and S160), and extracts the proprietary data ID information that meets the input search information (S195). With this configuration, it becomes possible to narrow-down the preview images to be displayed by the communication apparatus 10 as a list (S220).

By causing the communication apparatus 10 to execute the JavaScript program 182, it becomes possible to cause the communication apparatus 10 to download the tape medium image file of the tape medium. Then, the preview image, which is drawn based on the designated preview image data, is displayed together with the preview image of the tape medium, which is drawn based on the tape medium image file, in the synthesized manner (S265). Since the preview image with the appearance of the tape medium added is displayed, it becomes possible to make the appearance of the preview image closer to the image actually formed on the tape medium.

If the user has instructed to change the color of the preview image in S275, a process to change the color information (S440) is applied to the preview image data generated by causing the deciphering program 183 to process the proprietary data (S435). Further, if the user has instructed to edit the text and/or replace the object image in S275, the preview image data reflecting the instructed modifications is generated by the deciphering program 183 (S435). Thus, the preview image of which color has been changed and/or the preview image of which the text has been edited can be generated.

According to the illustrative embodiment, the continuous preview display process (S277) can be executed using the preview image data stored in the memory 74 in S220 or S453. With this configuration, the continuous preview display process can be executed without executing the data communication between the control serve 100 and the communication apparatus 10, the amount of data exchanged between the control server 100 and the communication apparatus 10 can be reduced.

In S10, it is possible to store, in the control server 100, the JavaScript program 180 to cause the communication apparatus to execute a process of acquiring various pieces of information in S120, S140 and S160, and a process of acquiring user input to edit the proprietary data in S265.

Further, it is possible to make the first storage server 200 for storing the proprietary data, preview image data and the like may be different from the control server 100. Further, it is possible to make the second storage server 300 for storing the registration character data, file names, be different from the control serve 100 on which the Web-API program runs. With this configuration, load to the control server 100 on which the Web-API program 181 runs can be reduced.

It is noted that the illustrative embodiment is described above for only an illustrative purpose and is not intended to limit the scope of the invention. The scope of the invention should be defined by the claims, and not only the illustrative invention but also various modifications thereof should be included in the scope of the invention.

Modifications

According to the illustrative embodiment, a tape medium is used. However, the invention needs not be limited to the tape medium, and various types of medium can be used. Further, the proprietary data needs not be limited to the data to be used by a printing device that prints images on the various medium, and can be data proprietary to respective devices. It is noted that the device that uses the proprietary data could be sawing machines capable of forming embroider or quilt. Further, the device that uses the proprietary data could be sawing machine capable of forming decorative stitches or the like based on the proprietary data. The device that uses the proprietary data could be a 3D printer capable of forming 3D images by spraying and machining based on the proprietary data. Further, the device that uses the proprietary data could be a product forming device configured to form a product by spraying and machining based on the proprietary data. In this case, the proprietary data may be 3D image data or 3D CAD data. The proprietary data may be generated by a scanner configured to generate the proprietary data based on output data from a sensor that optically or electrically detects a profile of an object and/or output data from sensors attached to an object. The proprietary data may be generated by a scanner configured to generate the proprietary data representing a shape and/or a movement of an object based on output of a sensor.

The JavaScript program 182 needs not be limited to the control server 100, but may be stored in another server which is not shown in figures.

It is noted that the Web-API program may also have functions of the HTTP server program. In this case, the particular operation system 180 needs not have the HTTP server program 184.

A process of searching proprietary data having the language information, the material information and the width information that meet the searching condition may be executed by the control server 100. For this modification, step S187 may be omitted, and in S190, the characteristic information, the medium information and the location information of the preview image data that correspond to the proprietary data ID information may be received from the second storage server 300. Then, the CPU 172 may extract the proprietary data ID information that meets the searching information from among a plurality of pieces of proprietary data ID information obtained from the second storage server 300. Specifically, the CPU 172 may extract the proprietary data ID information that is associated with the language information, the material information and the medium information having the width information that meet the selected language information, the selected material information and the selected width information included in the searching information.

As a method of spuriously drawing the texture of the tape medium in S265, various methods may be employed. For example, the CPU 72 may modify a background of the preview image which is drawn based on the designated preview image data to a background expressing the texture based on the JavaScript program 182 and the tape medium image file.

In S35, the Web-API server may upload the registration preview image data to the first server 200. When uploading, the Web-API server may request the first storage server 200 to store the registration preview image data in the storage folder of the preview image data with a generated file name. In this case, in S210, the CPU 72 of the communication apparatus 10 may transmit the preview image data request information to the first storage server 200. Then, in S215, the first storage server 200 may transmit the preview image data to the communication apparatus 10.

In S550, the CPU 172 may store the complete proprietary data in the storage folder for the proprietary data in the memory 174 with the generated file name. In this case, the CPU 172 simply generate access information for accessing the storage folder in the memory 174. The CPU 72 of the communication apparatus 10 may transmit the complete proprietary data request information to the control server 100 in S570, and download the complete proprietary data from the control server 100 in S575.

It is noted that a process of displaying the preview list page screen (S110-S230) may be omitted. In this case, the designation of the proprietary data by the user may be acquired in S240. Further, the continuous preview display process (S277) may be omitted. Accordingly, the Web-API server program 181 may need to have, at least, "a designated image information transmitting function," "a modification designated image information obtaining function," and "a modification designated image information transmitting function." Specifically, the Web-API serer program 181 may need to execute at least the steps of S250, S269, S435 or S440, and S450.

According to the illustrative embodiment, a single communication apparatus 10 is connected to the Internet 6. The configuration may be modified such that a plurality of communication apparatuses may be connected to the Internet 6.

According to the illustrative embodiment, it is described that the CPUs 72, 172, 272 and 372 of the communication apparatus 10, the control server 100, the first storage server 200 and the second storage server 300 respectively execute processes in accordance with the software. The invention need not be limited to such a configuration. For example, at least a part of the functions realized by the software in the illustrative embodiment may be realized by hardware such as a logic circuit and the like.

According to still further aspects of the disclosures, there is provided a non-transitory computer-readable recording medium for a server apparatus which has a processor, a network interface, a storage device storing a plurality of pieces of proprietary data having a proprietary format and used to form an image on a formation medium, the server apparatus being configured to be installed with a deciphering program which is capable of deciphering the proprietary data, the server apparatus being configured to execute an HTTP communication with a communication apparatus, the recording medium storing a control program having instructions to be executed by the processor. The instructions cause, when executed by the processor, the sever apparatus to obtain the proprietary data output by the communication apparatus through the network interface, and store the obtained proprietary data in the storage device, generate image information including preview image data, which has a generally used format the communication apparatus is capable of reading and displaying, and used to preview an image formed based on the obtained proprietary data and accompanying information, which has a generally used format the communication apparatus is capable of reading and recognizing as information, and is accompanying information of the image, with use of the deciphering program, store the generated image information in association with the proprietary data identification information identifying the obtained proprietary data in the storage device, when designated proprietary data identification information which is output by the communication apparatus and designates at least one of a plurality of pieces of proprietary data stored in the storage device, the designated proprietary data identification information being information associated with information indicating display of the proprietary data editing screen used to input an instruction to edit the proprietary data stored in the storage device, retrieve the designated image information associated with the designated proprietary data designated by the obtained designated proprietary data identification information from the storage device, and transmit the retrieved designated image information to the communication apparatus that output the designated proprietary data identification information through the network interface, and when the server apparatus obtains the modification information output by the communication apparatus and indicating modifications to the designated image formed based on the designated proprietary data, retrieve the designated proprietary data from the storage device, and edit the retrieved designated proprietary data in accordance with the obtained modification information with user of the deciphering program.

According to further aspects of the disclosures, there is provided a server apparatus, which has a processor, a network interface and a storage device storing a plurality of pieces of proprietary data having a proprietary format and used to form an image on a formation medium, the server apparatus being configured to be installed with a deciphering program which is capable of deciphering the proprietary data, the server apparatus being configured to execute an HTTP communication with a communication apparatus, the recording medium storing a control program having instructions to be executed by the processor. The instructions cause, when executed by the processor, the sever apparatus to, obtain the proprietary data output by the communication apparatus through the network interface, and store the obtained proprietary data in the storage device, generate image information including preview image data, which has a generally used format the communication apparatus is capable of reading and displaying, and used to preview an image formed based on the obtained proprietary data and accompanying information, which has a generally used format the communication apparatus is capable of reading and recognizing as information, and is accompanying information of the image, with use of the deciphering program, store the generated image information in association with the proprietary data identification information identifying the obtained proprietary data in the storage device, when designated proprietary data identification information which is output by the communication apparatus and designates at least one of a plurality of pieces of proprietary data stored in the storage device, the designated proprietary data identification information being information associated with information indicating display of the proprietary data editing screen used to input an instruction to edit the proprietary data stored in the storage device, retrieve the designated image information associated with the designated proprietary data designated by the obtained designated proprietary data identification information from the storage device, and transmit the retrieved designated image information to the communication apparatus that output the designated proprietary data identification information through the network interface, and when the server apparatus obtains the modification information output by the communication apparatus and indicating modifications to the designated image formed based on the designated proprietary data, retrieve the designated proprietary data from the storage device, and edit the retrieved designated proprietary data in accordance with the obtained modification information with user of the deciphering program.

It is noted that the programs may be recording in a non-transitory recording medium and distributed. The term "non-transitory recording medium" could included a CD-ROM, a DVD-ROM, and a storage device provided to a server apparatus which is connectable to the control server 100 through a communication network. The programs stored in the storage device of the server may be distributed through the communication network such as the Internet as information or electric signals representing/carrying the programs. For example, a distributor of a Web-API server program may store the Web-API server program and JavaScript program in the non-transitory recording medium, and transmit the Web-API server program and JavaScript program to a plurality of control servers 100 respectively provided in a plurality of stores. If an administrator of each store considers the design of each page screen and prepare the page screen data intrinsic to the store, it becomes possible to allow the user to edit the proprietary data through the page screens which are different for respective stores.

What is claimed is:

1. A non-transitory computer-readable recording medium for a server apparatus which has a processor, a network interface, a storage device storing a plurality of pieces of proprietary data having a proprietary format and used to form an image on a formation medium, the server apparatus being configured to be installed with a deciphering program which is capable of deciphering the proprietary data, the server apparatus being configured to execute an HTTP communication with a communication apparatus, the recording medium storing a control program having instructions to be executed by the processor, when the network interface obtains designated proprietary data identification information that is output by the communication apparatus and designates at least one of the plurality of pieces of the proprietary data stored in the storage device, the instructions cause, when executed by the processor, the sever apparatus to:

transmit designated image information including designated preview image data, which has a generally used format which the communication apparatus is capable of read and display, and is used to previewing designated image which is formed based on the designated proprietary data designated by the designated proprietary data identification information and designated accompanying information, which has a generally used format which the communication apparatus is capable of read and recognize as information, and is accompanying information of the designated image to the communication apparatus that output the designated proprietary data through the network interface;

when the network interface obtains the modification information, which is output by the communication apparatus after the designated image information is transmitted, and represents modifications to the designated image, retrieve the designated proprietary data from the storage device, and obtain modified designated image information reflecting the modification information based on the retrieved designated proprietary data and obtained modification information with use of the deciphering program; and transmit the modified designated image information to the communication apparatus that output the modification information through the network interface.

2. The non-transitory computer-readable recording medium according to claim 1,
wherein the instructions further cause the sever apparatus to:
when the designation instruction information, which is information requesting for transmission of designated proprietary data reflecting the modification information, and is output by the communication apparatus that output the modification information, is obtained through the network interface after the modified designated image information is transmitted, execute a process to reflect the modification information obtained from the communication apparatus to the designated proprietary data retrieved from the storage device with use of the deciphering program; and
transmit the designated proprietary data reflecting the modification information to the communication apparatus through the network interface.

3. The non-transitory computer-readable recording medium according to claim 1,
wherein the instructions further cause the sever apparatus to:
when preview image request information, which is output by one of the plurality of communication apparatuses and requests for a plurality of preview images respectively formed based on the plurality of pieces of proprietary data stored in the storage device, is obtained through the network interface, transmit a plurality of pieces of preview image data used to preview the images respectively formed based on the plurality of pieces of the proprietary data stored in the storage device to the communication apparatus that output the preview image request information through the network interface; and
when designated proprietary data identification information, which is one of the plurality of pieces of the proprietary data identification information output by the communication apparatus that output the preview image request information, is obtained through the network interface after the preview image is transmitted, transmit the designated image information to the communication apparatus that output the designated proprietary data identification information through the network interface.

4. The non-transitory computer-readable recording medium according to claim 3,
wherein the instructions further cause the sever apparatus to:
when preview image request information, which is output by one of the plurality of communication apparatuses and requests for a plurality of preview images formed based on the plurality of pieces of proprietary data stored in the storage device, is obtained through the network interface together with characteristic information representing characteristics of the proprietary data, extract one or more pieces of proprietary data related to the characteristic information from among the plurality of pieces of the proprietary data, and transmit the preview image data corresponding to the extracted proprietary data through the network interface.

5. The non-transitory computer-readable recording medium according to claim 1,
wherein the instructions further cause the sever apparatus to:
when the server apparatus obtains modified accompanying information, which is the designated accompanying information with at least part thereof having been modified and output by the communication apparatus, through the network interface, obtain the modified designated image information reflecting the modification information based on the retrieved designated proprietary data and modification information that is obtained modified accompanying information.

6. The non-transitory computer-readable recording medium according to claim 1,
wherein the instructions further cause the sever apparatus to:
when the server apparatus obtains the proprietary data output by one of the plurality of communication apparatuses through the network interface, generate image information including preview image data, which has a generally used image format the communication apparatus is capable of read and display and is used to preview the image formed based on the obtained proprietary data, and accompanying information of the image, which has a generally used format the communication apparatus is capable of read and recognize as information, by deciphering the proprietary data;
store the image information in association with proprietary data identification information identifying the proprietary data obtained through the network interface; and
when the server apparatus obtains the proprietary data identification information output by the one of the plurality of the communication apparatuses through the network interface, transmit the image information, which is stored in the storage device in association with designated proprietary data identification information that is the obtained proprietary data identification information, to the communication apparatus which output the proprietary data identification information.

7. The non-transitory computer-readable recording medium according to claim 1,
wherein the instructions further cause the sever apparatus to:
when the obtained modification information includes information indicative of previewing an appearance of the medium, obtain the designated image information including the preview image data in order to generate a preview image having a transparent background image.

8. The non-transitory computer-readable recording medium according to claim 1,
wherein the instructions further cause the sever apparatus to:
when the obtained modification information includes modification information which can be processed with use of the deciphering program, generate the designated image information including the designated preview image data reflecting the modification information by processing the obtained modification information and the designated proprietary data retrieved from the storage device with use of the deciphering program.

9. The non-transitory computer-readable recording medium according to claim 1,
wherein the instructions further cause the sever apparatus to:
when the obtained modification information includes first modification information which can be processed with use of the deciphering program and second modification information which cannot be processed with use of the deciphering program, generate the designated preview image data reflecting only the first modification information by processing the first modification information and the designated proprietary data retrieved from the storage device with use of the deciphering program, and generate the designated preview image data reflecting both the first modification information and the second modification information by applying an additional process necessary to reflect the second modification information to the designated preview image data reflecting the first modification information.

10. The non-transitory computer-readable recording medium according to claim 1,
wherein the instructions further cause the sever apparatus to:
when the obtained modification information includes first modification information representing change of a shape of the designated image and second modification information representing change of a color of the designated image, generate the designated preview image data reflecting only the change of the shape of the designated image by processing the first modification information and the designated proprietary data retrieved from the storage device with use of the deciphering program, and generate the designated preview image data reflecting both the change of the shape and the color by applying an additional process to change the color of the image to the designated preview image data reflecting the change of the shape of the designated image.

11. The non-transitory computer-readable recording medium according to claim 1,
wherein the instructions cause, when executed by the processor, the sever apparatus to:
obtain the proprietary data output by the communication apparatus through the network interface, and store the obtained proprietary data in the storage device;
generate image information including (a) preview image data, which has a generally used format the communication apparatus is capable of reading and displaying, and used to preview an image formed based on the obtained proprietary data and (b) accompanying information, which has a generally used format the communication apparatus is capable of reading and recognizing as information, and is accompanying information of the image, with use of the deciphering program; and
store the generated image information in association with the proprietary data identification information identifying the obtained proprietary data in the storage device.

12. The non-transitory computer-readable recording medium according to claim 11,
wherein the instructions further cause the sever apparatus to:
when preview image request information, which is output by one of the plurality of communication apparatuses and requests for a plurality of preview images respectively formed based on the plurality of pieces of proprietary data stored in the storage device, is obtained through the network interface, transmit a plurality of pieces of preview image data used to preview the images respectively formed based on the plurality of pieces of the proprietary data stored in the storage device to the communication apparatus that output the preview image request information through the network interface; and
when designated proprietary data identification information, which is one of the plurality of pieces of the proprietary data identification information output by the communication apparatus that output the preview image request information, is obtained through the network interface after the preview image is transmitted, transmit the designated image information to the communication apparatus that output the designated proprietary data identification information through the network interface.

13. The non-transitory computer-readable recording medium according to claim 12,
wherein the instructions further cause the sever apparatus to:
obtain characteristic information indicating characteristics regarding the proprietary data to be obtained;
store the obtained characteristic information in the storage device in association with the image information and the proprietary data identification information; and
when the server apparatus obtains preview image request information which is output by one of the plurality of communication apparatuses and requests a plurality of preview images formed based on a plurality of pieces proprietary data stored in the storage device, and selected characteristic information representing characteristic information selected by the user, through the network interface, extract one or more pieces of proprietary data identification information related to the selected characteristic information from the storage device, and transmit the preview image data corresponding to proprietary data identified by the extracted proprietary data identification information through the network interface.

14. The non-transitory computer-readable recording medium according to claim 11,
wherein the server apparatus includes a first storage server apparatus configured to execute a communication with the plurality of communication apparatuses based on the HTTP,
wherein the instruction further cause the server apparatus to:
store the obtained proprietary data in the first storage server apparatus; and
when the server apparatus obtains the modification information through the network interface, retrieve the designated proprietary data from the first storage server apparatus.

15. The non-transitory computer-readable recording medium according to claim 11, wherein the server apparatus includes a second storage server apparatus configured to execute a communication with the plurality of communication apparatuses based on the HTTP, wherein the instructions further cause the sever apparatus to:

store the accompanying information in the second storage server apparatus; and when the server apparatus obtains the modification information through the network interface, retrieve the accompanying information from the second storage server apparatus.

16. The non-transitory computer-readable recording medium according to claim 11, wherein the server apparatus includes a first storage server apparatus configured to execute a communication with the plurality of communication apparatuses based on the HTTP, wherein the instructions further cause the sever apparatus to:

store the preview image data in the first storage server apparatus; and when the server apparatus obtains the modification information through the network interface, retrieve the preview image data from the first storage server apparatus.

17. A non-transitory computer-readable recording medium for a communication apparatus which has a processor, a network interface and a display unit, the communication apparatus being configured to execute an HTTP communication with a server apparatus, the recording medium storing a control program having instructions to be executed by the processor, the server apparatus storing a plurality of pieces of proprietary data having proprietary format and is used to form an image on a medium, the server apparatus being configured to be installed with a deciphering program capable of deciphering the proprietary data, the recording medium storing a control program having instructions to be executed by the processor, the instructions, when executed by the processor, cause the communication apparatus to:

transmit designated proprietary identification information designating at least one of the plurality of pieces of proprietary data stored in the server apparatus to the server apparatus through the network interface;

obtain designated image information including designated preview image data, which has a generally used image format which the communication apparatus is capable of reading and displaying and is used to preview the designated image that is formed based on designated proprietary data designated by the obtained designated proprietary data identification information and designated accompanying information, which has a generally used image format the communication apparatus is capable of reading and recognizing as information and is accompanying information of the designated image, from the server apparatus through the network interface;

display a designated image preview image on the display device based on the obtained designated image information;

monitor whether modification is applied to the designated image preview image displayed on the display unit and transmit modification information representing the modification to the designated image when the modification is detected to the server apparatus through the network interface; and obtain modification designated information, which has a generally used image format the communication apparatus is capable of reading and is used to display designated image reflecting the modification information, from the server apparatus through the network interface; and display modified designated image preview image which is a preview image of the modified designated image based on the modified designated image information.

18. The non-transitory computer-readable recording medium according to claim 17, wherein the instructions further cause the communication apparatus to:

transmit designated instruction information requesting the server apparatus to transmit designated proprietary data reflecting the modification information to the server apparatus through the network interface after the modified designated image information is obtained; and obtain designated proprietary data, which is proprietary data to which the modification information is applied with use of the deciphering program, from the server apparatus through the network interface.

19. The non-transitory computer-readable recording medium according to claim 17, wherein the instructions further cause the communication apparatus to:

transmit preview image request information which requests for a plurality of preview images which are formed based on a plurality of proprietary data stored in the storage device to the server apparatus trough the network interface; and obtain a plurality of pieces of preview image data used to preview the images formed based on the plurality of pieces of proprietary data stored in the storage device after the preview image request information is transmitted, wherein, when the designated proprietary data is transmitted through the network interface after the preview image data is obtained, the designated image information is obtained from the server apparatus through the network interface.

20. The non-transitory computer-readable recording medium according to claim 17, wherein the instructions further cause the communication apparatus to:

when the modification information includes information representing a preview of the appearance of the medium, obtain the modified designated image information including the designated preview image data used to generate a preview image having a transparent background image; and display an image drawn based on the designated preview image data on the display unit in a synthesized manner with the preview image of the medium.

21. The non-transitory computer-readable recording medium according to claim 17, wherein the instructions further cause the communication apparatus to:

store the modified designated image information in the storage device of the communication apparatus; and when the communication apparatus receives an instruction to display a print preview to continuously display the modified designated image preview images arranged on the medium after the modified designated image preview images on the display unit, display the plurality of modified designated images preview images continuously on the display unit based on the modified designated image information stored in the storage unit.

22. The non-transitory computer-readable recording medium according to claim 17,
wherein the control program is written with an object-oriented script language,
wherein the control program is stored in the server apparatus, the control program being downloaded to the communication apparatus from the server apparatus and read by the processor of the communication apparatus to operate.

23. A server apparatus, comprising:
a processor;
a network interface;
a storage device storing a plurality of pieces of proprietary data having a proprietary format and used to form an image on a formation medium,
wherein the server apparatus is configured to be installed with a deciphering program which is capable of deciphering the proprietary data, the server apparatus being configured to execute an HTTP communication with a communication apparatus, the recording medium storing a control program having instructions to be executed by the processor,
wherein, when the network interface obtains designated proprietary data identification information that is output by the communication apparatus and designates at least one of the plurality of pieces of the proprietary data stored in the storage device, the instructions cause, when executed by the processor, the sever apparatus to:
transmit designated image information including designated preview image data, which has a generally used format which the communication apparatus is capable of read and display, and is used to previewing designated image which is formed based on the designated proprietary data designated by the designated proprietary data identification information and designated accompanying information, which has a generally used format which the communication apparatus is capable of read and recognize as information, and is accompanying information of the designated image to the communication apparatus that output the designated proprietary data through the network interface; and
when the network interface obtains the modification information, which is output by the communication apparatus after the designated image information is transmitted, and represents modifications to the designated image, retrieve the designated proprietary data from the storage device, and obtain modified designated image information reflecting the modification information based on the retrieved designated proprietary data and obtained modification information with use of the deciphering program; and
transmit the modified designated image information to the communication apparatus that output the modification information through the network interface.

24. The server apparatus according to claim 23,
wherein the storage device stores a process execution program which is to be installed in each of the plurality of communication apparatuses and run to execute a process to cause the communication apparatus to receive the modified information, and
wherein the processor further causes the server apparatus to transmit the process execution program to the communication apparatus that output the designated proprietary data identification information and the modification information through the network interface.

25. The sever apparatus according to claim 23,
wherein the instructions cause, when executed by the processor, the sever apparatus to:
obtain the proprietary data output by the communication apparatus through the network interface, and store the obtained proprietary data in the storage device;
generate image information including (a) preview image data, which has a generally used format the communication apparatus is capable of reading and displaying, and used to preview an image formed based on the obtained proprietary data and (b) accompanying information, which has a generally used format the communication apparatus is capable of reading and recognizing as information, and is accompanying information of the image, with use of the deciphering program; and
store the generated image information in association with the proprietary data identification information identifying the obtained proprietary data in the storage device.

26. A communication apparatus comprising:
a processor;
a network interface; and
a display unit,
wherein the communication apparatus being configured to execute an HTTP communication with a server apparatus, the recording medium storing a control program having instructions to be executed by the processor, the server apparatus storing a plurality of pieces of proprietary data having proprietary format and is used to form an image on a medium, the server apparatus being configured to be installed with a deciphering program capable of deciphering the proprietary data, the recording medium storing a control program having instructions to be executed by the processor,
the instructions, when executed by the processor, cause the communication apparatus to:
transmit designated proprietary identification information designating at least one of the plurality of pieces of proprietary data stored in the server apparatus to the server apparatus through the network interface;
obtain designated image information including designated preview image data, which has a generally used image format which the communication apparatus is capable of reading and displaying and is used to preview the designated image that is formed based on designated proprietary data designated by the obtained designated proprietary data identification information and designated accompanying information, which has a generally used image format the communication apparatus is capable of reading and recognizing as information and is accompanying information of the designated image, from the server apparatus through the network interface;
display a designated image preview image on the display device based on the obtained designated image information;
monitor whether modification is applied to the designated image preview image displayed on the display unit and transmit modification information representing the modification to the designated image when the modification is detected to the server apparatus through the network interface; and
obtain modification designated information, which has a generally used image format the communication apparatus is capable of reading and is used to display designated image reflecting the modification information, from the server apparatus through the network interface; and display modified designated image preview image which is a preview image of the modified designated image based on the modified designated image information.

* * * * *